(12) United States Patent
Zhuang

(10) Patent No.: US 12,222,243 B2
(45) Date of Patent: Feb. 11, 2025

(54) MODULATOR, IMAGING APPARATUS, AND DESIGN METHOD

(71) Applicant: SONY GROUP CORPORATION, Tokyo (JP)

(72) Inventor: Tuo Zhuang, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 116 days.

(21) Appl. No.: 17/759,492

(22) PCT Filed: Jan. 25, 2021

(86) PCT No.: PCT/JP2021/002371
§ 371 (c)(1),
(2) Date: Jul. 26, 2022

(87) PCT Pub. No.: WO2021/157398
PCT Pub. Date: Aug. 12, 2021

(65) Prior Publication Data
US 2023/0090261 A1 Mar. 23, 2023

(30) Foreign Application Priority Data
Feb. 3, 2020 (JP) .................. 2020-016582

(51) Int. Cl.
*G01J 3/18* (2006.01)
*G01J 3/02* (2006.01)
*G01J 3/12* (2006.01)

(52) U.S. Cl.
CPC .............. *G01J 3/1804* (2013.01); *G01J 3/027* (2013.01); *G01J 2003/1217* (2013.01)

(58) Field of Classification Search
CPC .. G01J 3/1804; G01J 3/027; G01J 2003/1217; G01J 3/2803; G01J 3/0229; G03B 15/05; G03B 15/14; G03B 15/00
See application file for complete search history.

(56) References Cited

U.S. PATENT DOCUMENTS

2002/0101587 A1 8/2002 Wilson et al.
2007/0165223 A1 7/2007 Wilson et al.
(Continued)

FOREIGN PATENT DOCUMENTS

CN 210774359 U 6/2020
JP 2010276552 A * 12/2010
(Continued)

OTHER PUBLICATIONS

English Translation of Kawamata et al. JP2010276552A Description (Year: 2010).*

(Continued)

*Primary Examiner* — Tarifur R Chowdhury
*Assistant Examiner* — Akbar H. Rizvi
(74) *Attorney, Agent, or Firm* — CHIP LAW GROUP

(57) ABSTRACT

A modulator according to the embodiment is a modulator provided between a diffraction grating and an image sensor. The modulator receives a light ray directed to the image sensor from the diffraction grating, and changes a travel direction of the light ray emitted toward the image sensor so as to bend a recording direction of a diffraction image for each wavelength of the light ray on a light receiving surface of the image sensor.

9 Claims, 26 Drawing Sheets

(56) References Cited

U.S. PATENT DOCUMENTS

| | | | |
|---|---|---|---|
| 2007/0182962 A1 | 8/2007 | Bearman et al. | |
| 2010/0309467 A1* | 12/2010 | Fox | G01J 3/0294 356/326 |
| 2011/0206291 A1* | 8/2011 | Kashani | G01J 4/04 356/73 |
| 2011/0285995 A1* | 11/2011 | Tkaczyk | G01J 3/02 356/326 |
| 2015/0043092 A1* | 2/2015 | Suzuki | G02B 9/34 359/773 |
| 2016/0202178 A1 | 7/2016 | Acosta et al. | |
| 2017/0139204 A1* | 5/2017 | Pauly | G02B 27/0927 |

FOREIGN PATENT DOCUMENTS

| | | |
|---|---|---|
| JP | 2011-080980 A | 4/2011 |
| JP | 2012-508366 A | 4/2012 |
| JP | 2016-090576 A | 5/2016 |
| WO | 2013/046257 A1 | 4/2013 |
| WO | 2019/216213 A1 | 11/2019 |

OTHER PUBLICATIONS

International Search Report and Written Opinion of PCT Application No. PCT/JP2021/002371, issued on Apr. 20, 2021, 10 pages of ISRWO.

Habel, et ai., "Practical Spectral Photography" Computer Graphics Forum (Proceedings Eurographics 2012, vol. 31 (2012), No. 2, pp. 449-458.

Tebow, et ai., "A Tunable Snapshot Imaging Spectrometer", Proceedings of the SPIE, Proc. SPIE 5159, Jan. 2004, vol. 5159, pp. 64-72.

Dwight, et al., "Lenslet Array Tunable Snapshot Imaging Spectrometer (LATIS) for hyperspectral biological imaging", Biomedical Optics Express 1952, vol. 8, No. 3, Mar. 2017.

* cited by examiner

FIG.31
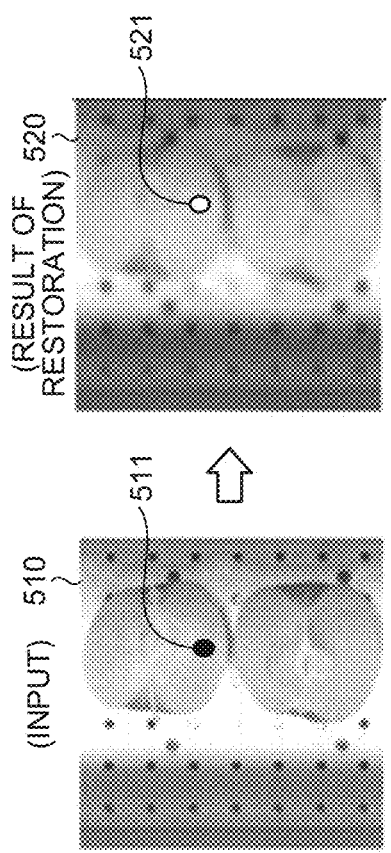
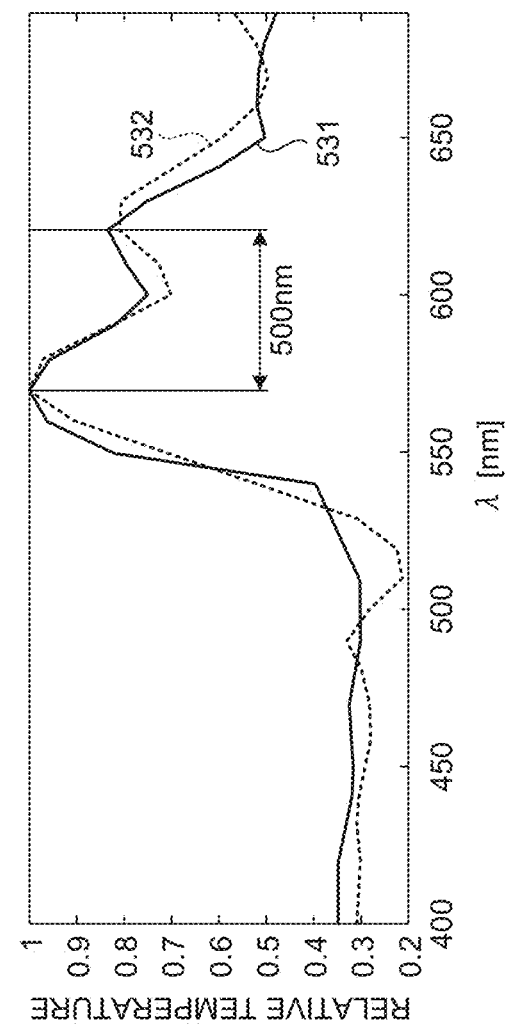
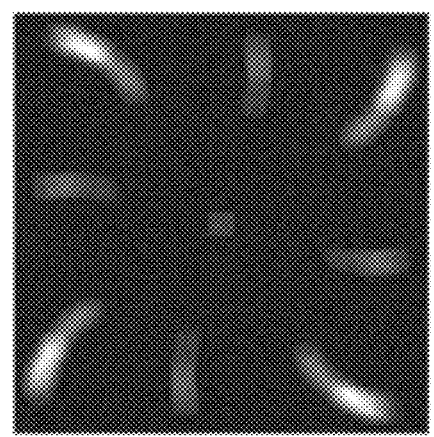

MODULATOR, IMAGING APPARATUS, AND DESIGN METHOD

CROSS REFERENCE TO RELATED APPLICATIONS

This application is a U.S. National Phase of International Patent Application No. PCT/JP2021/002371 filed on Jan. 25, 2021, which claims priority benefit of Japanese Patent Application No. JP 2020-016582 filed in the Japan Patent Office on Feb. 3, 2020. Each of the above-referenced applications is hereby incorporated herein by reference in its entirety.

FIELD

The present disclosure relates to a modulator, an imaging apparatus, and a design method.

BACKGROUND

Conventionally, a spectroscopic measurement method is known as a method of analyzing a composition of an object. A spectroscopic measurement method is a method of analyzing emitted light, reflected light, or transmitted light from an object, to analyze a composition (element, molecular structure, and the like) of the object.

The light wavelength component of emitted light, reflected light, or transmitted light from an object varies depending on the composition of the object. Thus, analyzing the wavelength component of light from an object enables analysis of the composition of the object. In general, data indicating a quantity for each wavelength is referred to as a wavelength spectrum, and a process of measuring a wavelength spectrum is referred to as a spectroscopic measurement process.

In analyzing the composition of each point on the surface of an object, it is necessary to acquire data on correspondence between spatial information and wavelength information of the object. A snapshot method is known as a method of acquiring data on correspondence between spatial information and wavelength information of an object by a single operation of processing the data on correspondence between the spatial information and the wavelength information of the object, that is, a single photographing process using a spectroscopic measurement apparatus. A spectroscopic measurement apparatus adopting the snapshot method is formed of a combination of an optical system including a plurality of lenses, slits (field stop), spectroscopic elements, and the like, and a sensor. The spatial resolution and wavelength resolution of the spectroscopic measurement apparatus are determined by the configurations of the optical system and the sensor.

CITATION LIST

Patent Literature

Patent Literature 1: JP 2016-90576 A

Non Patent Literature

Non Patent Literature 1: Habel, R., Kudenov, M., Wimmer, M.: Practical spectral photography. Computer Graphics Forum (Proceedings EUROGRAPHICS 2012) 31 (2), 449-458 (2012)

Non Patent Literature 2: Tebow, Christopher P.; Dereniak, Eustace L.; Garrood, Dennis; Dorschner, Terry A.; Volin, Curtis E.: Tunable snapshot imaging spectrometer. Proceedings of the SPIE, Volume 5159, pp. 64-72 (2004)

Non Patent Literature 3: Dwight J G, Tkaczyk T S.: Lenslet array tunable snapshot imaging spectrometer (LATIS) for hyperspectral fluorescence microscopy. Biomed Opt Express. 2017; 8: 1950-64

SUMMARY

Technical Problem

A spectroscopic element such as a prism or a diffraction grating typically used in a spectroscopic measurement apparatus disperses incident light in a uniaxial direction or a biaxial direction depending on the wavelength of the incident light. Meanwhile, an imaging area of an image sensor for capturing a spectral image is mostly a rectangular area. This means that the image sensor has many imaging areas where no spectral image is incident.

As described above, with such a spectroscopic element as generally used in the conventional art, it is difficult to efficiently use an imaging area of an image sensor used in a spectroscopic measurement apparatus or the like.

In view of this, the present disclosure proposes a modulator, an imaging apparatus, and a design method that enable more efficient use of an imaging area of an image sensor.

Solution to Problem

To solve the problems described above, a modulator provided between a diffraction grating and an image sensor, according to an embodiment of the present disclosure, receives a light ray directed to the image sensor from the diffraction grating and changes a travel direction of the light ray emitted toward the image sensor so as to bend a recording direction of a diffraction image for each of wavelengths of the light ray on a light receiving surface of the image sensor.

Moreover, an imaging apparatus according to an embodiment of the present disclosure includes: a diffraction grating; an image sensor having a light receiving surface placed within a first distance of the diffraction grating; and a modulator provided between the diffraction grating and the image sensor, wherein the modulator receives a light ray directed to the image sensor from the diffraction grating and changes a travel direction of the light ray emitted toward the image sensor so as to bend a recording direction of a diffraction image for each of wavelengths of the light ray on a light receiving surface of the image sensor.

Moreover, a method of designing a modulator, according to an embodiment of the present disclosure, that changes a travel direction of a light ray received from a diffraction grating and emits the light ray to an image sensor includes: tracking behaviors of an incident light ray and an emitted light ray of the modulator in a space; determining a surface normal of the modulator based on the incident light ray and the emitted light ray; and integrating the surface normal to determine a shape of the modulator.

BRIEF DESCRIPTION OF DRAWINGS

FIG. 31 is a view illustrating a result of simulation of the spectroscopic measurement apparatus according to the embodiment.

DESCRIPTION OF EMBODIMENTS

Hereinafter, an embodiment of the present disclosure will be described in detail with reference to the drawings. In the following embodiment, the same parts are denoted by the same reference signs, and duplicated description will be omitted.

The present disclosure will be described in the following order of items.

Figure 1:
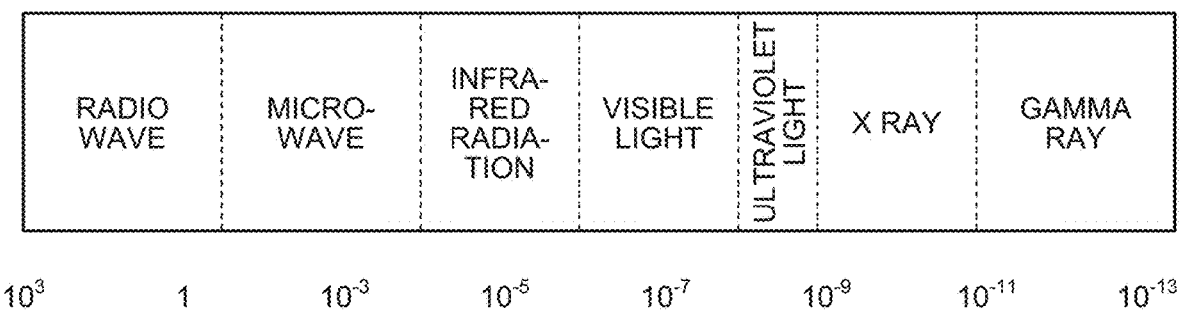
FIG. 1 is a view for explaining a relationship between a kind of light and a wavelength.

1. Overview of spectroscopic measurement apparatus (system)
2. Problems associated with snapshot method
3. Embodiment
   3.1 Overview of spectroscopic measurement apparatus
   3.2 Arrangement of modulator
   3.3 Design example of modulator
   3.4 Simulation result
   3.5 Operations and effects
   3.6 Modification of the embodiment
   3.7 Design example of modulator according to the modification of the embodiment
   3.8 Example of application to mobile unit
   3.9 Example of application to endoscopic surgery system First, an overview of a spectroscopic measurement apparatus (system) will be provided. As light, infrared radiation, visible light, ultraviolet light, and the like are known. These kinds of light are electromagnetic waves, and have different wavelengths (vibration periods) depending on each kind of light as illustrated in FIG. 1.

Visible light has a wavelength in a range from about 400 nm to 700 nm, and infrared radiation has a longer wavelength than that of visible light. Meanwhile, ultraviolet light has a shorter wavelength than that of visible light.

As described above, emitted light, reflected light, or transmitted light from an object has a light wavelength component that varies depending on the composition (element, molecular structure, and the like) of the object. Analyzing the wavelength component enables analysis of the composition of the object. In general, data indicating a quantity for each wavelength is referred to as a wavelength spectrum, and a process of measuring a wavelength spectrum is referred to as a spectroscopic measurement process.

Figure 2:
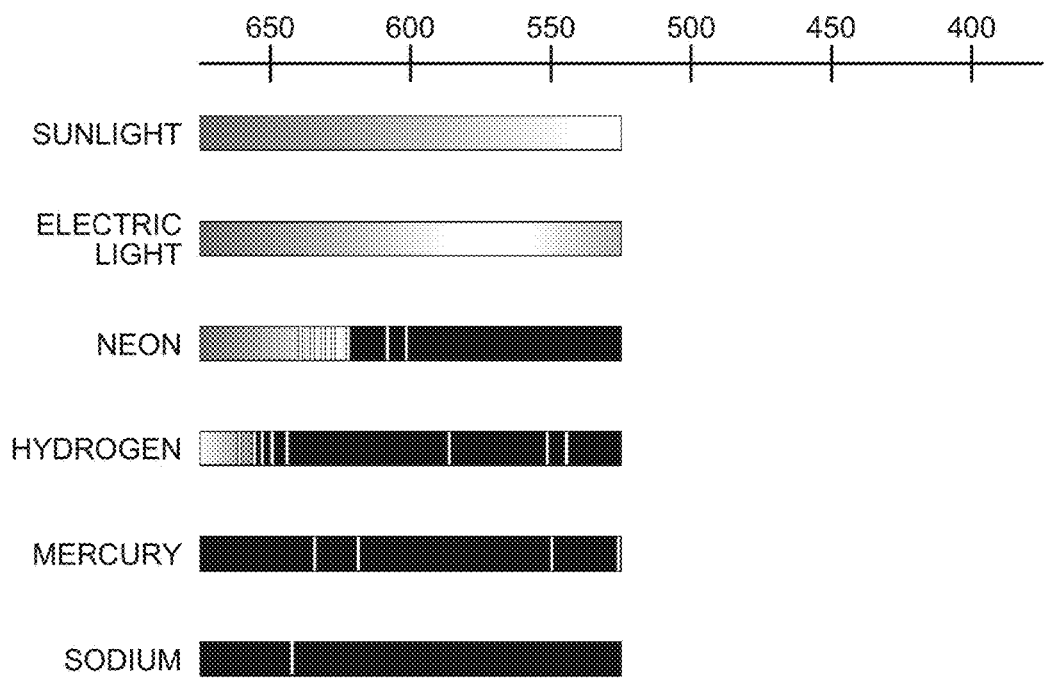
FIG. 2 is a view for explaining an example of spectroscopic measurement of a light emitting object.

FIG. 2 is a view illustrating an example of spectroscopic measurement of a light emitting object. FIG. 2 illustrates respective wavelengths of light output by the sunlight, an electric light, neon, hydrogen, mercury, and sodium, in a visible-light wavelength range (about 400 nm to 700 nm). An area where an output is provided is displayed in a whitish color, and an area where no output is provided is illustrated in black. FIG. 2 illustrates results of spectroscopic measurement of the sunlight and output light from an electric light and various heated substances.

As illustrated in FIG. 2, each of the objects including the sun, an electric light, neon, hydrogen, mercury, and sodium outputs light having a wavelength inherent thereto. Thus, though an object is unknown, the composition thereof can be analyzed by analysis of the wavelength component contained in light from the object.

Figure 3:
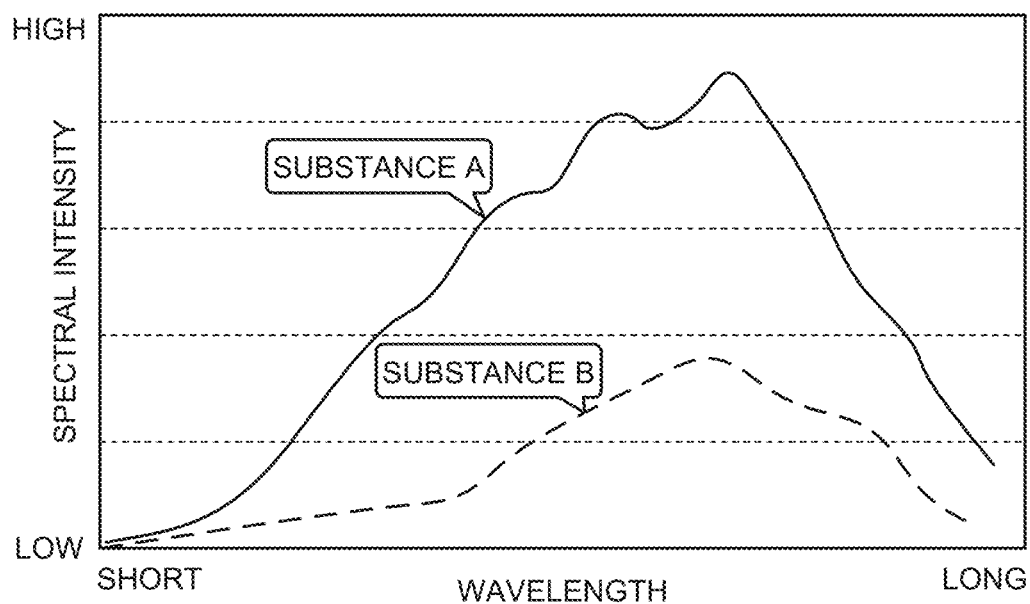
FIG. 3 is a view illustrating an example of a result of spectral intensity analysis, corresponding to a result of spectral analysis of output light of a certain food product.

For example, in a case where the composition of a certain processed food product is unknown, it is possible to analyze a substance composing the food product by analyzing output light (emitted light, reflected light, or transmitted light) of the food product. FIG. 3 is a view illustrating an example of a result of spectral intensity analysis, corresponding to a result of spectral analysis of output light of a certain food product. Two different spectral analysis results have been obtained from this food product.

By comparing the analysis results of spectral intensity with analysis-result data on spectral intensity of various substances having been analyzed in advance, it is possible to determine what a substance A and a substance B are, and thus analyze the composition of the food product.

As described above, when spectroscopic measurement is available, various kinds of information on a measured object can be acquired. However, in a generally-used camera having a condenser and a sensor, light having all wavelengths that are mixed is incident on each pixel of the sensor, which makes it difficult to analyze the intensity for each wavelength.

For this reason, an observation system for spectroscopic measurement is provided with a spectroscopic element (spectroscopic device) for separating light falling on the camera, into light of each wavelength.

Figure 4:
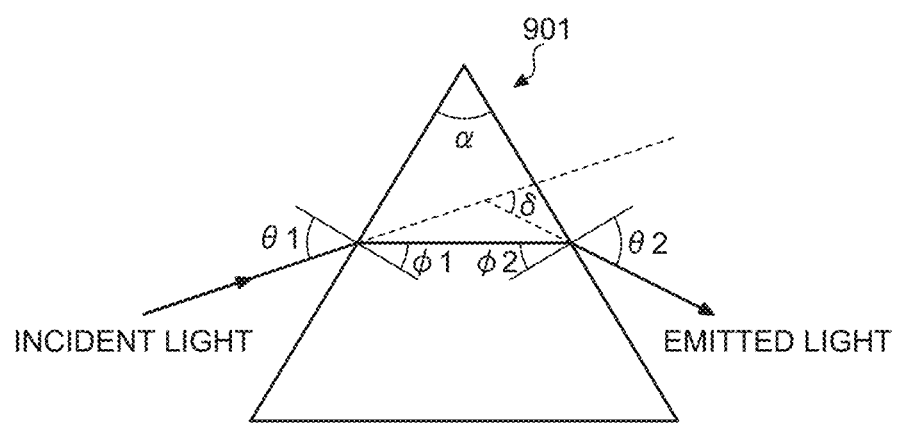
FIG. 4 is a view for explaining a prism serving as a spectroscopic element.

A prism 901 illustrated in FIG. 4 can be presented as the most popular spectroscopic element. Light incident on the prism 901, that is, light of various wavelengths included in incident light, is emitted from the prism 901 at an emission angle corresponding to the wavelength and the incident angle of the incident light and the shape of the prism 901. The observation system for spectroscopic measurement is provided with a spectroscopic element such as the prism 901, and has a configuration in which a sensor can receive light of each wavelength individually.

In light dispersion by a prism having a refractive index n, an equation indicating a change in a travel direction of light by the prism can be expressed as the following equation (1).

$$\delta = \theta_1 - \phi_1 + \theta_2 - \phi_2 = \theta_1 + \theta_2 - \alpha \quad (1)$$

Each parameter of the above equation (1) is as follows.
α: apical angle of the prism
$\theta_1$: incident angle with respect to an incidence plane of the prism
$\theta_2$: emission angle with respect to an emission surface of the prism
$\phi_1$: refraction angle of the incidence plane of the prism
$\phi_2$: refraction angle of the emission surface of the prism
δ: deviation (angle between incident light and emitted light)

Then, according to Snell's law (sin $\theta_j$=n sin $\Phi_j$), the above equation (1) can be rewritten as the following equation (2).

$$\delta = \theta_1 + \sin^{-1}(n \cdot \sin(\alpha - \phi_1)) \quad (2)$$

In the above equation (2), n is the refractive index of the prism, and the refractive index n depends on a wavelength. Further, $\phi_1$ is the refraction angle of the incidence plane of the prism, and depends on the refractive index n of the prism and the incident angle $\theta_1$ with respect to the incidence plane of the prism. Thus, the deviation (angle between the incident light and the emitted light) δ depends on the incident angle $\theta_1$ and a wavelength.

Figure 5:
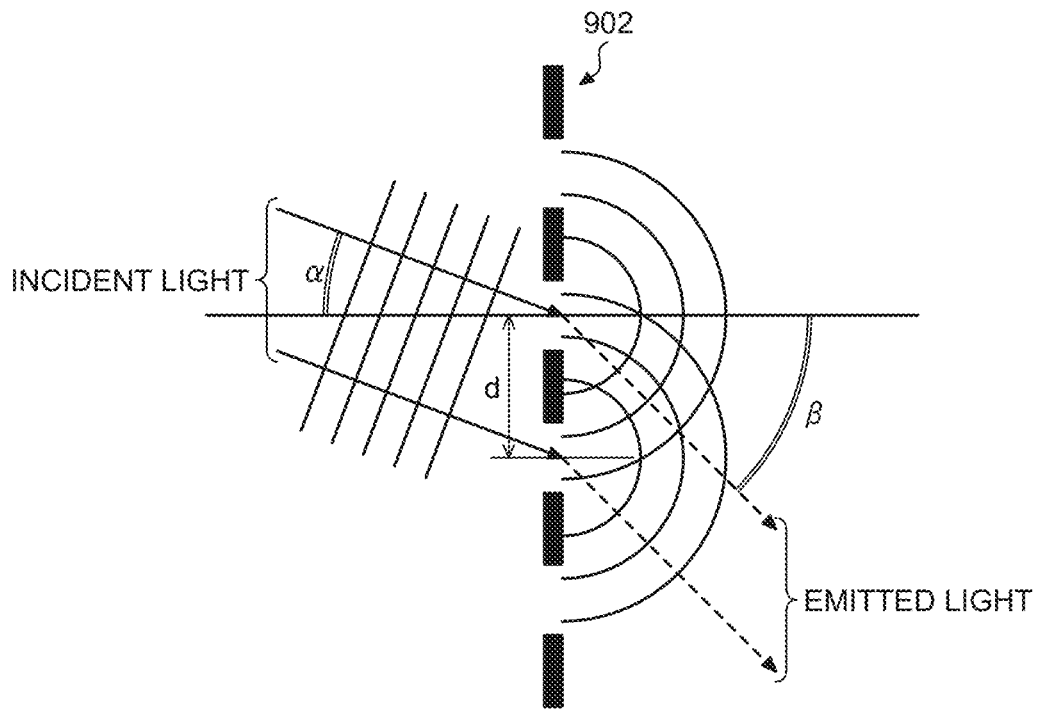
FIG. 5 is a view for explaining a diffraction grating serving as a spectroscopic element.

Moreover, as illustrated in FIG. 5, also light dispersion using a diffraction grating 902 by taking advantage of a property of light as a wave is possible. An emission angle (diffraction angle) β of a light ray provided by the diffraction grating 902 can be expressed by the following equation (3).

$$\beta = \sin^{-1}\left(\frac{m \cdot \lambda}{d} - \sin\alpha\right) \quad (3)$$

In the above equation (3), d is a grating spacing, α is an incident angle, β is an emission angle, and m is an order of diffraction.

However, while wavelength information about light from a certain point of an object is analyzed, such analysis enables analysis of only the composition of the point. Thus, in order to analyze the composition of each point on the surface of an object by a single observation, it is necessary to analyze all the light from each point on the surface.

Figure 6:
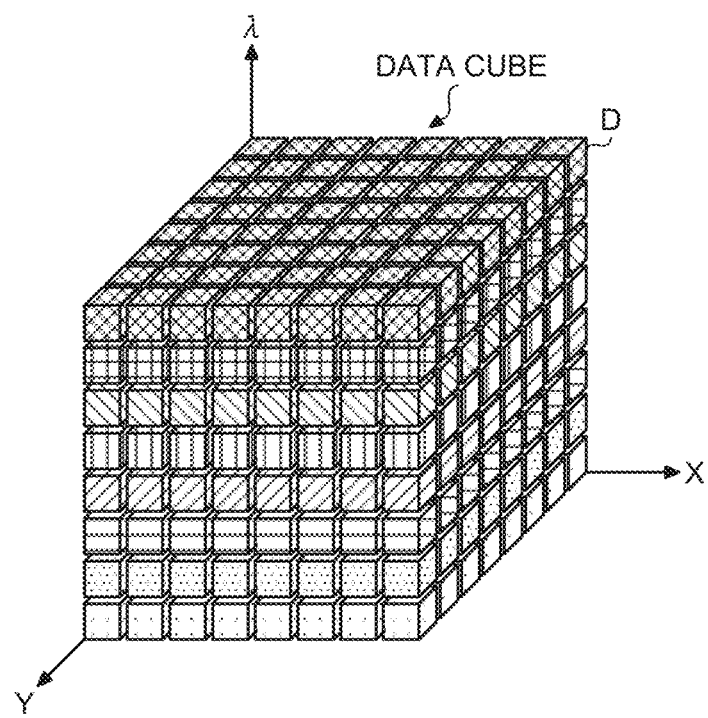
FIG. 6 is a view for explaining an example of a data cube formed of data having three dimensions of spatial directions (XY) and a wavelength direction (λ) of a measured object.

In order to analyze the composition of each point on the surface of a measured object, it is necessary to acquire data having three dimensions of spatial directions (XY) and a wavelength direction (λ) of the measured object by a single observation. FIG. 6 illustrates an example of a data cube formed of data having three dimensions of spatial directions (XY) and a wavelength direction (λ) of a measured object.

As illustrated in FIG. 6, the data cube is data having three dimensions of the spatial directions (XY) and the wavelength direction (λ) of a measured object. In the data, coordinates of each point on the surface of the measured object are indicated by XY coordinates, and the intensity (λ) of light of each wavelength at each coordinate position (x, y) is recorded. The data cube illustrated in FIG. 6 includes 8×8×8 cubes of data, and one cube D is data indicating the intensity of light of a specific wavelength (λ) at a specific position (x, y).

Additionally, the number of cubes illustrated in FIG. 6, 8×8×8, is an example, and the number of cubes varies depending on the spatial resolution and the wavelength resolution of a spectroscopic measurement apparatus.

Next, there will be described an example of an existing spectroscopic measurement apparatus that acquires a data cube as illustrated in FIG. 6, specifically, data having three dimensions of the spatial directions (XY) and the wavelength direction (λ) of a measured object.

Existing spectroscopic measurement apparatuses that acquire data having three dimensions of the spatial directions (XY) and the wavelength direction (λ) of a measured object are classified into four types as follows.

(a) One adopting a point measurement method (spectrometer)
(b) One adopting a wavelength scanning method
(c) One adopting a spatial scanning method
(d) One adopting a snapshot method Below, an overview of each of the above-described methods will be provided.

(a) One Adopting a Point Measurement Method (Spectrometer)

Figure 7:
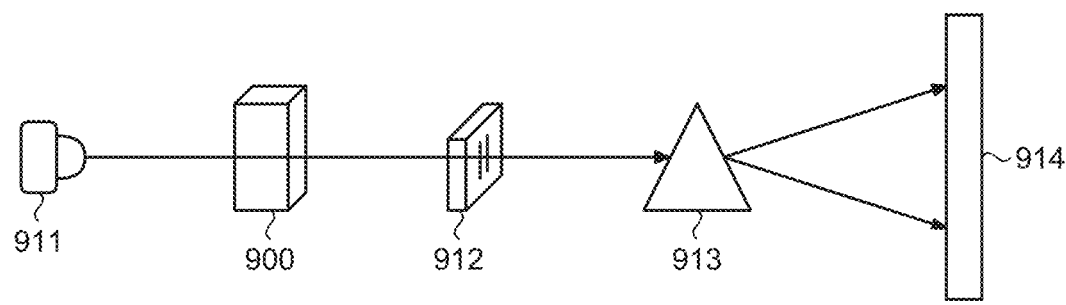
FIG. 7 is a view illustrating a schematic configuration example of a spectroscopic measurement apparatus adopting a point measurement method (spectrometer).
Figure 8:
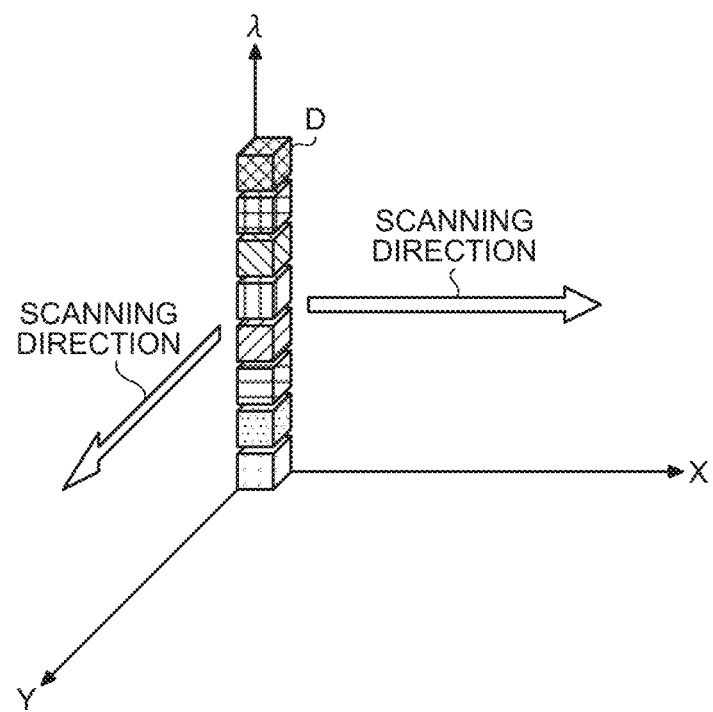
FIG. 8 is a view illustrating an example of data acquired in a single photographing process using the spectroscopic measurement apparatus adopting a point measurement method.

FIG. 7 is a view illustrating a schematic configuration example of a spectroscopic measurement apparatus adopting a point measurement method (spectrometer). FIG. 8 is a view illustrating an example of data acquired in a single photographing process using the spectroscopic measurement apparatus adopting a point measurement method.

As illustrated in FIG. 7, the spectroscopic measurement apparatus adopting a point measurement method includes a light source 911, a slit 912, a prism 913, and a linear sensor 914, and has a configuration in which light emitted from a single point of a measured object 900 is dispersed by the prism 913 serving as a spectroscopic element, and the dispersed light is projected on the linear sensor 914 in which elements are arranged only along one direction. With the above-described configuration, light rays of different wavelengths are recorded in different elements (pixels) on the linear sensor 914.

In the point measurement method, the value of each element (pixel) of the linear sensor 914 is read, whereby a wavelength spectrum is acquired. The feature of the point measurement method lies in that the wavelength resolution depends on the element size (the number of pixels) of the linear sensor 914. The more elements (pixels) are included, the more detailed wavelength information can be acquired.

However, in the point measurement method, light emitted from a single point of the measured object 900 is received and analyzed in a single photographing process. Thus, as illustrated in FIG. 8, only the wavelength information ($\lambda$) about a single point in the spatial directions (XY) of the measured object 900 can be acquired by a single photographing process. For this reason, in order to obtain the wavelength information ($\lambda$) about various points in the spatial directions (XY) of the measured object 900, there is a need to perform a photographing process and analysis many times while shifting a position of measurement.

(b) One Adopting a Wavelength Scanning Method

Figure 9:
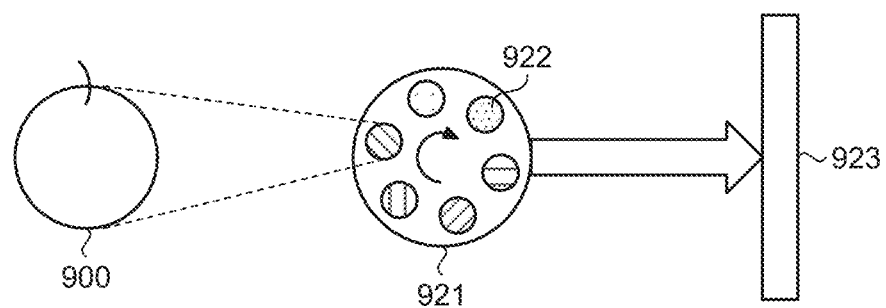
FIG. 9 is a view illustrating a schematic configuration example of a spectroscopic measurement apparatus adopting a wavelength scanning method.
Figure 10:
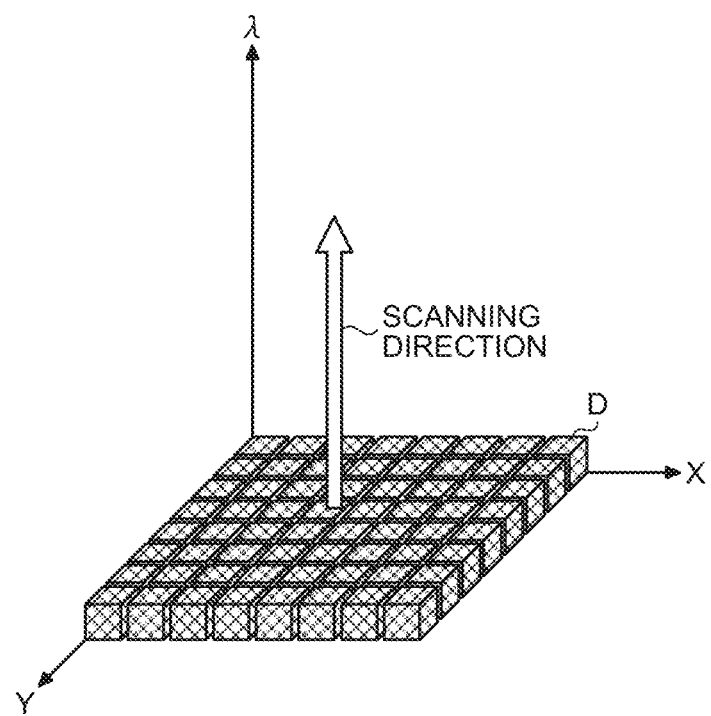
FIG. 10 is a view illustrating an example of data acquired in a single photographing process using the spectroscopic measurement apparatus adopting a wavelength scanning method.

FIG. 9 is a view illustrating a schematic configuration example of a spectroscopic measurement apparatus adopting a wavelength scanning method. FIG. 10 is a view illustrating an example of data acquired in a single photographing process using the spectroscopic measurement apparatus adopting a wavelength scanning method.

As illustrated in FIG. 9, the spectroscopic measurement apparatus adopting a wavelength scanning method includes a wavelength filter array 921 and an area sensor (two-dimensional image sensor) 923, and performs a photographing process while changing a plurality of optical filters 922 that are arranged in front of the area sensor 923 and have different wavelength transmitting properties, from one to another at regular time intervals.

According to the above-described procedure, as illustrated in FIG. 10, intensity information about a single wavelength corresponding to a plurality of spatial positions can be acquired by a single photographing process. Then, by performing a photographing process while changing the optical filters 922 from one to another, it is possible to acquire intensity information about a plurality of different wavelengths.

However, in order to achieve high wavelength resolution, there is a need to prepare many different optical filters 922 and perform a photographing process while changing the filters from one to another, which causes a problem of a long measurement time. Further, due to the property of the optical filters 922, there is caused another problem of existence of a wavelength band that cannot be acquired.

(c) One Adopting a Spatial Scanning Method

Figure 11:
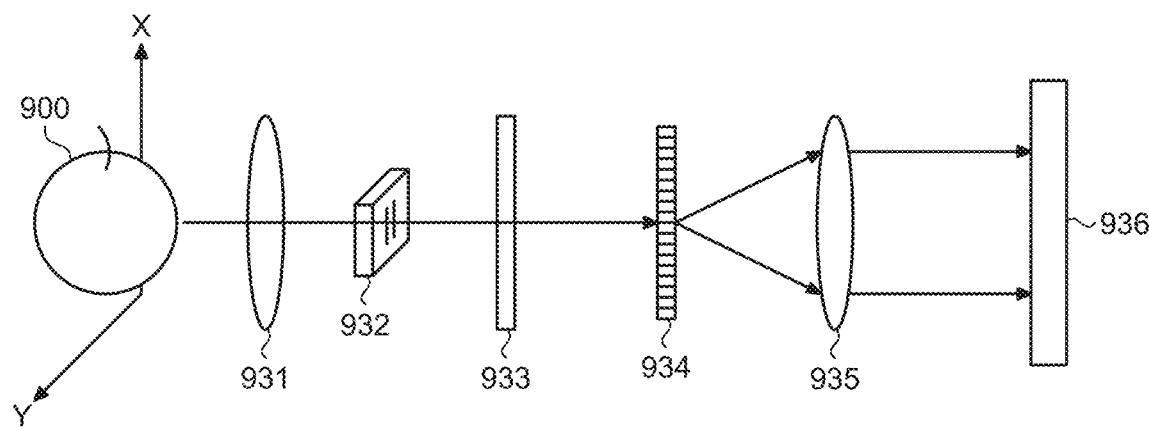
FIG. 11 is a view illustrating a schematic configuration example of a spectroscopic measurement apparatus adopting a spatial scanning method.
Figure 12:
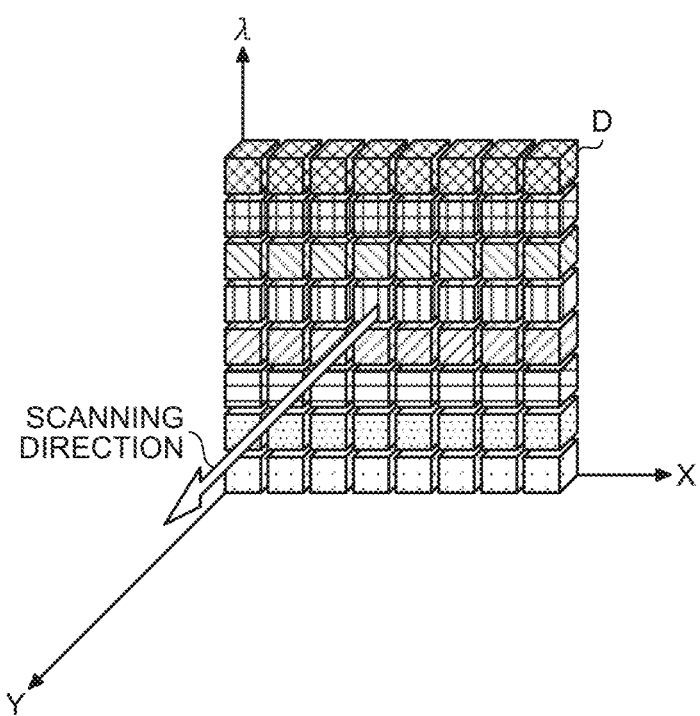
FIG. 12 is a view illustrating an example of data acquired in a single photographing process using the spectroscopic measurement apparatus adopting a spatial scanning method.

FIG. 11 is a view illustrating a schematic configuration example of a spectroscopic measurement apparatus adopting a spatial scanning method. FIG. 12 is a view illustrating an example of data acquired in a single photographing process using the spectroscopic measurement apparatus adopting a spatial scanning method.

As illustrated in FIG. 11, the spectroscopic measurement apparatus adopting a spatial scanning system includes an objective lens 931, a slit 932, a collimator lens 933, a spectroscopic element 934, an imaging lens 935, and an area sensor 936. In this apparatus, light from the measured object 900 is dispersed by the spectroscopic element 934 (prism, diffraction grating, or the like). Then, light in one spatial direction is recorded in X direction of the area sensor while light in a wavelength direction is recorded in Y direction of the area sensor. Further, as illustrated in FIG. 12, the spectroscopic measurement apparatus scans the measured object 900 in the remaining one direction. As a result of the above-described process, the data cube described above with reference to FIG. 6, that is, the data cube having three dimensions of the spatial directions (XY) and the wavelength direction ($\lambda$) of the measured object 900 can be acquired.

According to the spatial scanning method, high spatial resolution and high wavelength resolution can be achieved. However, there is a need for an apparatus large enough to scan, and a scanning time is required, which causes a problem of a long measurement time.

(d) One Adopting a Snapshot Method

Figure 13:
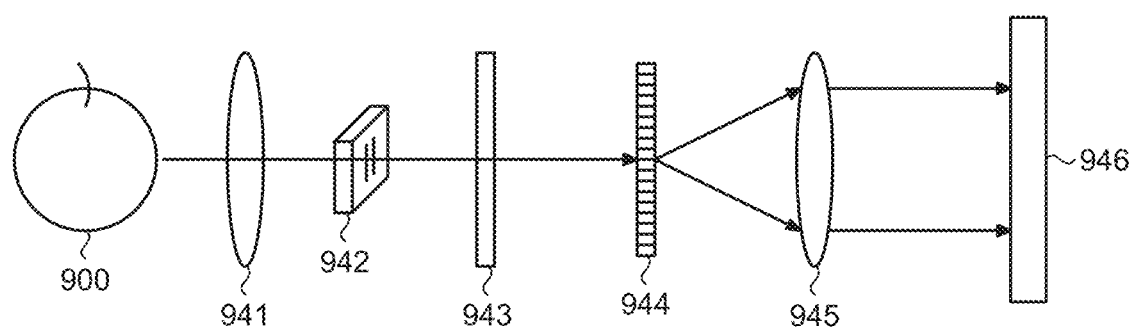
FIG. 13 is a view illustrating a schematic configuration example of a spectroscopic measurement apparatus adopting a snapshot method.
Figure 14:
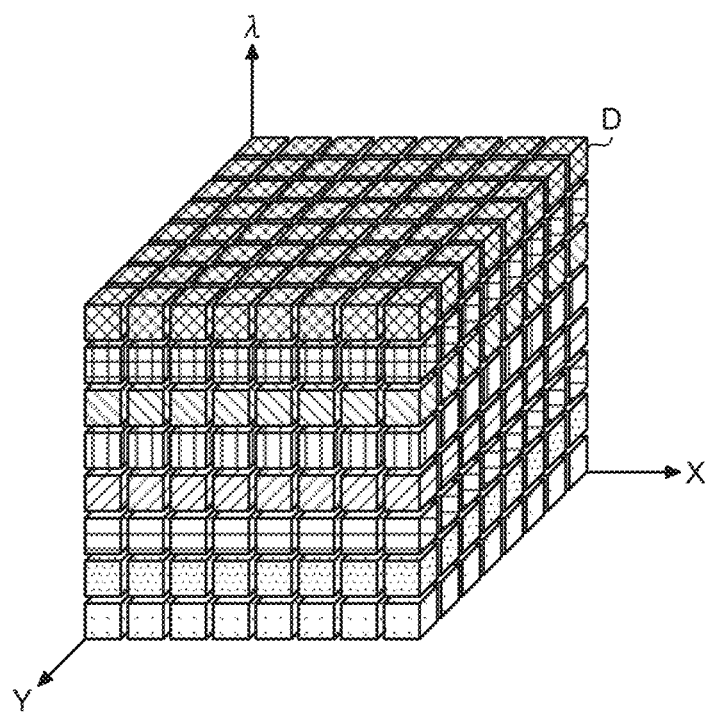
FIG. 14 is a view illustrating an example of data acquired in a single photographing process using the spectroscopic measurement apparatus adopting a snapshot method.

FIG. 13 is a view illustrating a schematic configuration example of a spectroscopic measurement apparatus adopting a snapshot method. FIG. 14 is a view illustrating an example of data acquired in a single photographing process using the spectroscopic measurement apparatus adopting a snapshot method.

As illustrated in FIG. 13, the spectroscopic measurement apparatus adopting a snapshot method includes an objective lens 941, a slit 942, a collimator lens 943, a diffraction-grating spectroscopic element (hereinafter simply referred to as a diffraction grating) 944, an imaging lens 945, and an area sensor 946. The apparatus has a configuration in which light from the measured object 900 is focused by the objective lens 941, is converted into parallel light by the collimator lens 943, is transmitted through the diffraction grating 944, and then is projected on a light receiving surface of the area sensor 946. Additionally, the light receiving surface may be a surface on which photoelectric conversion units such as photodiodes in an image sensor (also referred to as a solid-state imaging device) are arranged.

With the above-described configuration, light rays of different wavelength components from different points on the measured object 900 are recorded in different elements (pixels) on the light receiving surface of the area sensor 946.

According to the snapshot method, the data cube as described with reference to FIG. 6, specifically, the data cube having three dimensions of the spatial directions (XY) and the wavelength direction ($\lambda$) of the measured object 900 as illustrated in FIG. 14 can be acquired by a single photographing process.

However, a process of restoring the data cube by signal processing is required after the photographing process because the area for light reception of the area sensor 946 is finite and pieces of information in the wavelength direction are recorded while being superimposed on each other on the light receiving surface.

Further, various coefficients used for signal processing are linked with the performance of an optical system, which necessitates fixing of the optical system. More specifically, in using the optical system, the positional relationship between the optical system and the sensor is required to be fixed. This causes a problem of difficulty in adjusting the wavelength resolution and the spatial resolution in accordance with a purpose of application.

Figure 15:
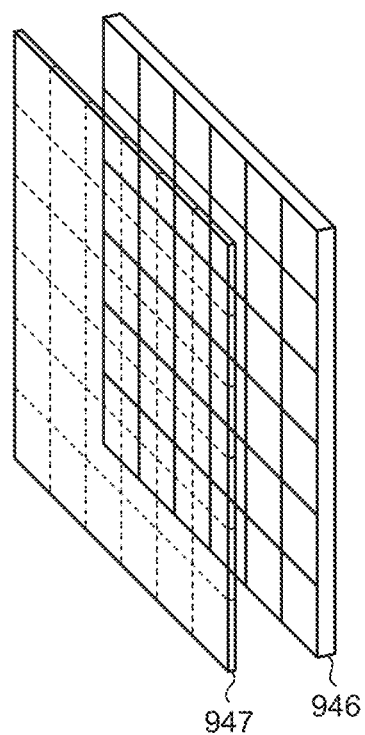
FIG. 15 is a view illustrating a modification of the spectroscopic measurement apparatus adopting a snapshot method.

Additionally, proposed examples of application of the snapshot method illustrated in FIG. 13 include such a configuration as illustrated in FIG. 15 in which an optical filter 947 having different transmission bands is spatially arranged on the light receiving surface of the area sensor 946, to acquire a data cube. However, the area for light reception is finite and the optical filter 947 is required to be mounted on the light receiving surface of the area sensor 946. This causes a problem of reduction in spatial resolution of the area sensor 946 due to the mounting of the optical filter 947.

The examples of the existing spectroscopic measurement apparatus that acquires data having three dimensions of the spatial directions (XY) and the wavelength direction ($\lambda$) of the measured object, that is, four types of methods of (a) a point measurement method (spectrometer), (b) a wavelength scanning method, (c) a spatial scanning method, and (d) a snapshot method, have been described with reference to FIGS. 7 to 14.

Among these four methods, (d) the snapshot method described with reference to FIGS. 13 and 14, in particular, is highly useful because a data cube can be acquired by a single photographing process.

Further, in order to solve the problem of difficulty in adjustment of wavelength resolution, a configuration using a diffraction grating that can be incorporated into an existing optical system at later time is more suitable than a sensor configuration in which a sensor and a filter are integrated.

Therefore, in the present disclosure, a snapshot spectroscopic measurement apparatus using a diffraction grating such as a spectroscopic measurement apparatus using a computed tomography imaging spectrometer (CTIS), for example, will be described below together with some examples.

2. Problems Associated with Snapshot Method

Figure 16:
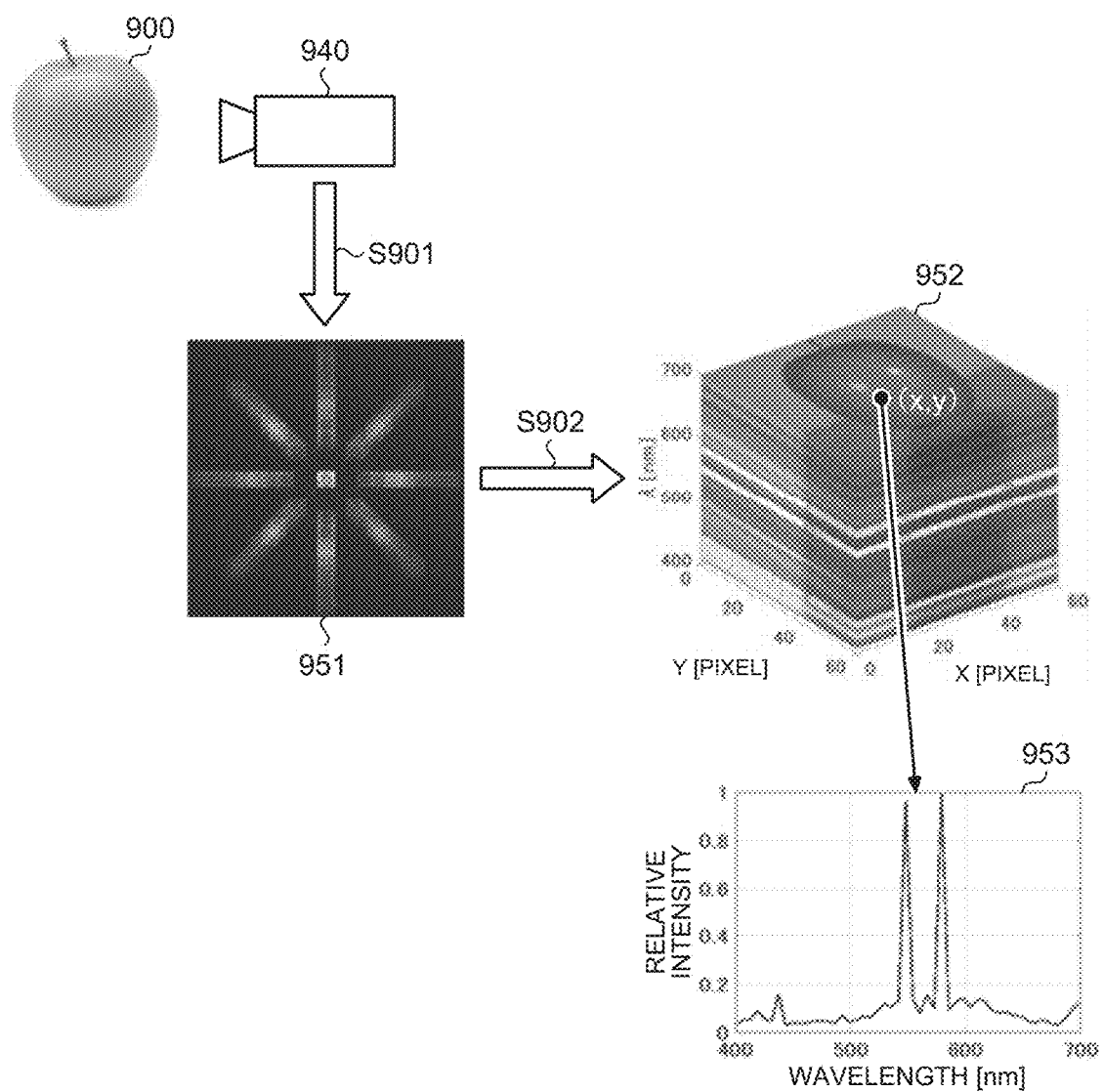
FIG. 16 is a view for explaining a data-cube restoration process in a snapshot method.

A data-cube restoration process in the snapshot method will be described with reference to FIG. 16. FIG. 16 illustrates a case where an image of the measured object 900 is captured by a snapshot spectroscopic measurement apparatus 940 including the diffraction grating 944 with a grating (see FIG. 13), as one example.

As illustrated in FIG. 16, when an image of the measured object 900 is captured by the spectroscopic measurement apparatus 940 including the diffraction grating 944 (S901), there is produced a captured image 951 in which diffraction images of ±first order or higher are projected in eight directions in total of up, down, left, and right directions and oblique directions around a diffraction image of 0th-order light located at the center.

By subjecting the captured image 951 to a binary matrix operation using a modulation matrix H prepared in advance, it is possible to restore a data cube g. Specifically, the data cube g can be restored by substitution of the acquired captured image 951 into the following equation (4). In the equation (4), x, y, and $\lambda$ represent an x coordinate, a y coordinate, and a wavelength $\lambda$ of a pixel in the captured image 951 (or a pixel array of the spectroscopic measurement apparatus 940), and f (x, y, $\lambda$) represents a pixel value of a pixel (x, y, $\lambda$) in the captured image 951.

$$g = Hf(x,y\lambda) \quad (4)$$

The solution of the equation (4) can be obtained by using optimization by an expectation maximization (EM) algorithm using the following equation (5), for example (S902). Thus, a data cube (g) 952 in which the horizontal plane is the XY coordinate system and the vertical direction is the wavelength axis can be acquired. Additionally, a graph 953 illustrates a wavelength spectrum of a pixel (x, y) in the data cube 952.

$$\hat{f}^{(k+1)} = \frac{\hat{f}^{(k)}}{\sum_{m=1}^{M} H_{mn}} \left( H^T \frac{g}{H \hat{f}^{(k)}} \right) \quad (5)$$

In the above-described snapshot spectroscopic measurement apparatus, a trade-off relationship is caused between the spatial resolution and the wavelength resolution due to size constraint on the image sensor that acquires a diffraction image. For example, in a case where a dispersion angle is increased to widen the spread of dispersed light in order to enhance the wavelength resolution, also the spread of a diffraction image is widened, which prohibits wide-range photographing, to reduce the spatial resolution. On the other hand, in a case where a dispersion angle is reduced in order to enhance the spatial resolution, an overlap of diffraction images having different wavelengths is increased, to reduce the wavelength resolution. Further, an increase in the wavelength range of dispersed light incident on one pixel of the image sensor due to size reduction of a diffraction image also causes reduction in wavelength resolution.

Figure 17:
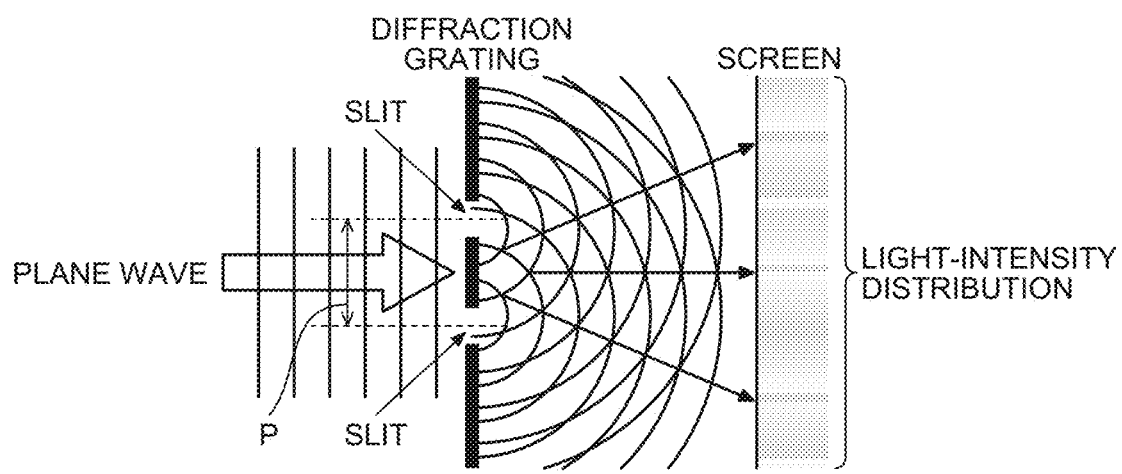
FIG. 17 is a view for explaining the principle of light dispersion by a diffraction grating with slits.
Figure 18:
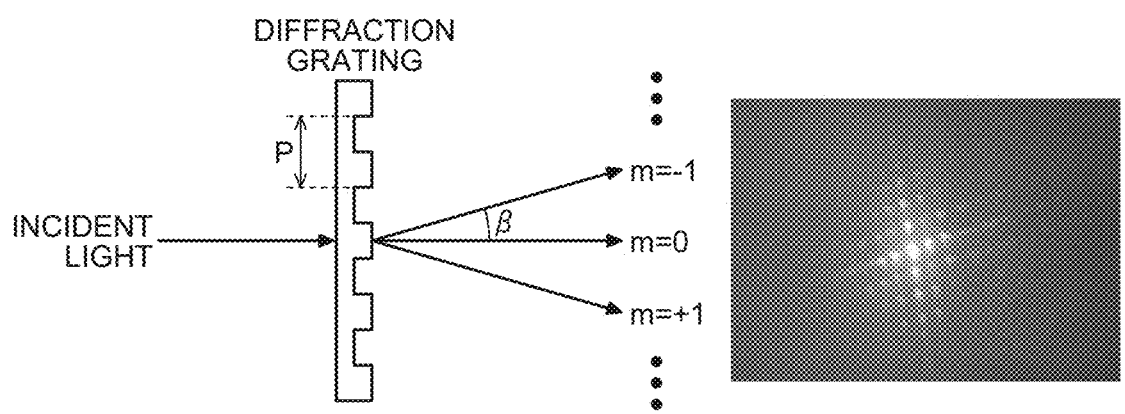
FIG. 18 is a view illustrating an example of an image of light dispersed by a diffraction grating with a grating.
Figure 19:
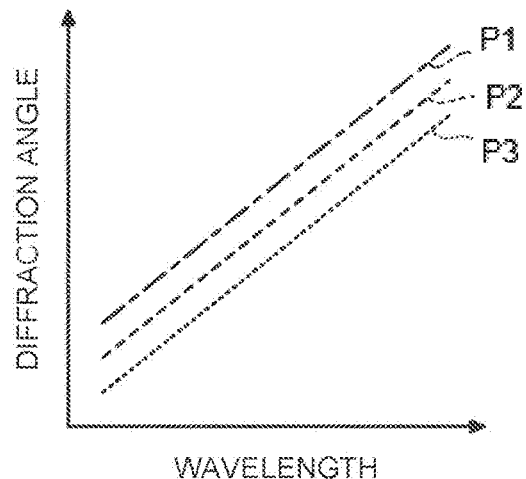
FIG. 19 is a view illustrating a relationship between a wavelength of incident light and a diffraction angle.

More specific details of the above-described matter will be provided. FIG. 17 is a view for explaining the principle of light dispersion by a diffraction grating with slits. FIG. 18 is a view illustrating an example of an image of light dispersed by a diffraction grating with a grating. FIG. 19 is a view illustrating a relationship between a wavelength of incident light and a diffraction angle.

As illustrated in FIG. 17, light (that is supposed to be a plane wave) incident on the diffraction grating passes through two slits and reaches a screen in the form of a spherical wave. At that time, there is caused a difference in optical path length between the light having passed through one slit and the light having passed through the other slit. For this reason, in the image of the incident light transferred to the screen, there occurs light gradation (differences in light intensity) in a pattern depending on the difference in optical path length, the wavelength $\lambda$ of the incident light, and the spacing (grating spacing P) between the slits.

This is applied to a diffraction grating with a grating in the following manner. Specifically, as illustrated in the left diagram of FIG. 18, incident light on the diffraction grating is diffracted at different diffraction angles $\beta$ obtained by the above-described equation (3), depending on the wavelength $\lambda$ and the grating spacing P of the diffraction grating. Additionally, in the equation (3), m represents an order. As a result, as illustrated in the right diagram of FIG. 18, the image of the light having passed through the diffraction grating (i.e., diffraction image) is an image in which ±first-order light, ±second-order light, . . . are arranged around the 0th-order light at the center.

This means that, with the fixed grating spacing P, the wavelength λ and the diffraction angle β are in a linear relationship as illustrated in FIG. 19. Additionally, in FIG. 19, straight lines P1, P2, and P3 correspond to grating spacings P1, P2, and P3, and the grating spacings P1, P2, and P3 are in a relationship of P1<P2<P3.

Figure 20:
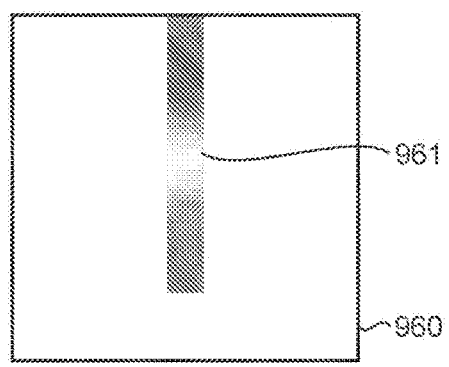
FIG. 20 is a view for explaining problems associated with a snapshot method (part 1).
Figure 21:
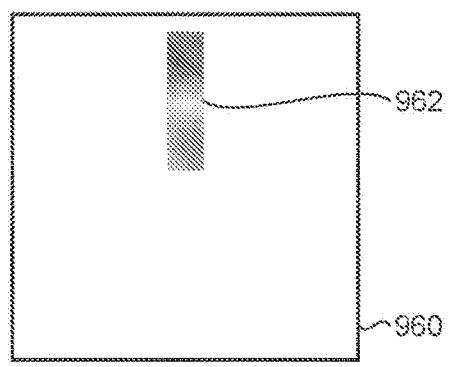
FIG. 21 is a view for explaining the problems associated with a snapshot method (part 2).

Because of the above-described relationship, as the grating spacing P decreases, the diffraction angle β increases. As a result, as illustrated in FIG. 20, the spread of a diffraction image 961 in a captured image 960 is widened, so that the wavelength resolution can be enhanced. On the other hand, as the grating spacing P increases, the diffraction angle β decreases. As a result, as illustrated in FIG. 21, the spread of a diffraction image 962 in the captured image 960 decreases, so that wider-range photographing can be performed, thereby enhancing the spatial resolution.

However, the method of adjusting the wavelength resolution and the spatial resolution only by control of the grating spacing is confronted with the following problems.

Figure 22:
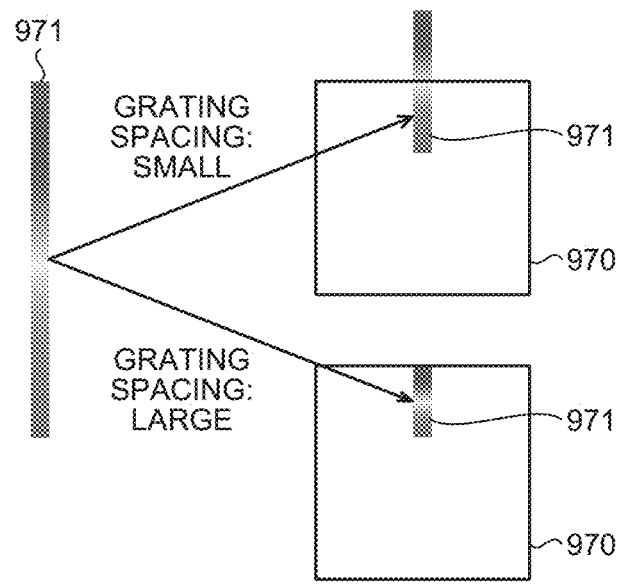
FIG. 22 is a view for explaining a first problem in a method of adjusting wavelength resolution and spatial resolution by controlling a grating spacing.

FIG. 22 is a view for explaining a first problem. As illustrated in FIG. 22, when the grating spacing P is reduced, the diffraction angle β increases at all the observed wavelengths. Thus, while the extent of a diffraction image 971 is widened, the diffraction image 971 may extend off an observable range 970 of the area sensor, depending on the sensor size of the area sensor. This increases the likelihood that accurate measurement is prevented. This means that the wavelength range that is desired to be measured and the wavelength resolution are in a trade-off relationship with each other.

Figure 23:
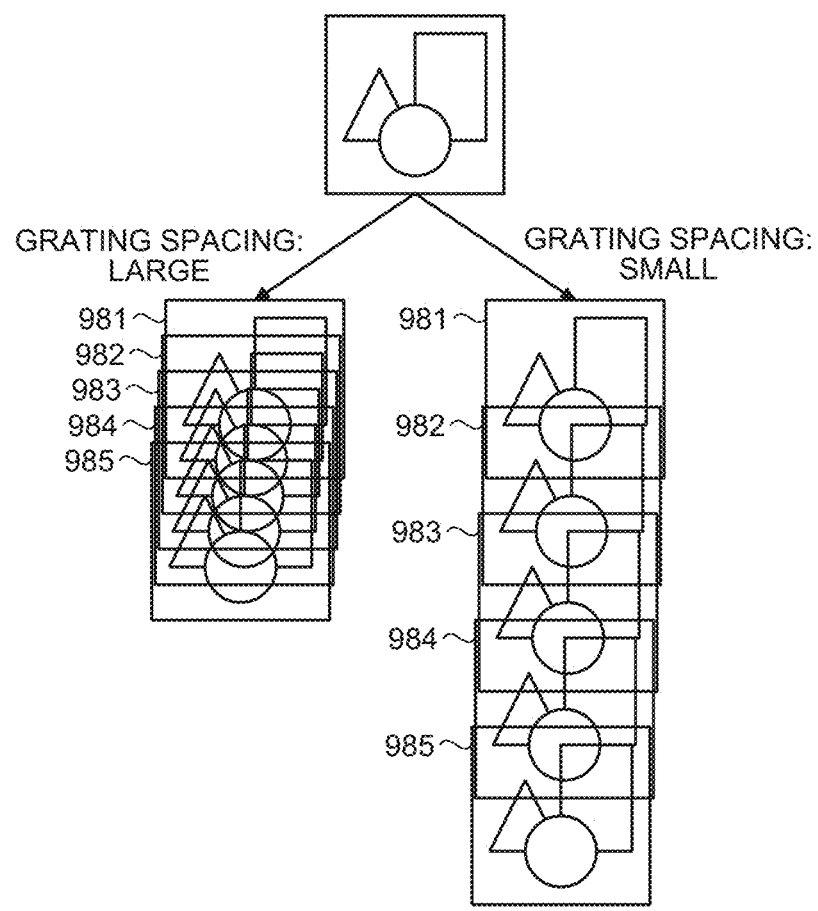
FIG. 23 is a view for explaining a second problem in the method of adjusting wavelength resolution and spatial resolution by controlling a grating spacing.

FIG. 23 is a view for explaining a second problem. As illustrated in FIG. 23, when the grating spacing P is increased, the spread of the entire diffraction image is reduced, so that the spatial resolution can be enhanced. Meanwhile, an overlap of diffraction images 981 to 985 having respective wavelengths is increased, so that the wavelength resolution is reduced. This means that the spatial resolution and the wavelength resolution are in a trade-off relationship with each other. Additionally, though the diffraction images 981 to 985 are slightly displaced from each other in the horizontal direction for easier understanding in FIG. 23, the diffraction images may be aligned to each other in the vertical direction actually.

As described above, the conventional snapshot spectroscopic measurement apparatus using a diffraction grating has difficulties in achieving high wavelength resolution while maintaining the spatial resolution because the spatial resolution and the wavelength resolution are in a trade-off relationship.

In view of this, in the following embodiment, a new modulator is proposed, to loosen the trade-off relationship between the observable wavelength range and the spatial resolution.

3. Embodiment

Next, a modulator and an imaging apparatus according to an embodiment will be described in detail with reference to the drawings. The embodiment is based on the snapshot spectroscopic measurement apparatus 940 using a diffraction grating described above with reference to FIGS. 13, 14, and 16. However, the present embodiment is not limited thereto, and can be applied to various optical apparatuses using a diffraction grating as a spectroscopic element.

3.1 Overview of Spectroscopic Measurement Apparatus

Figure 24:
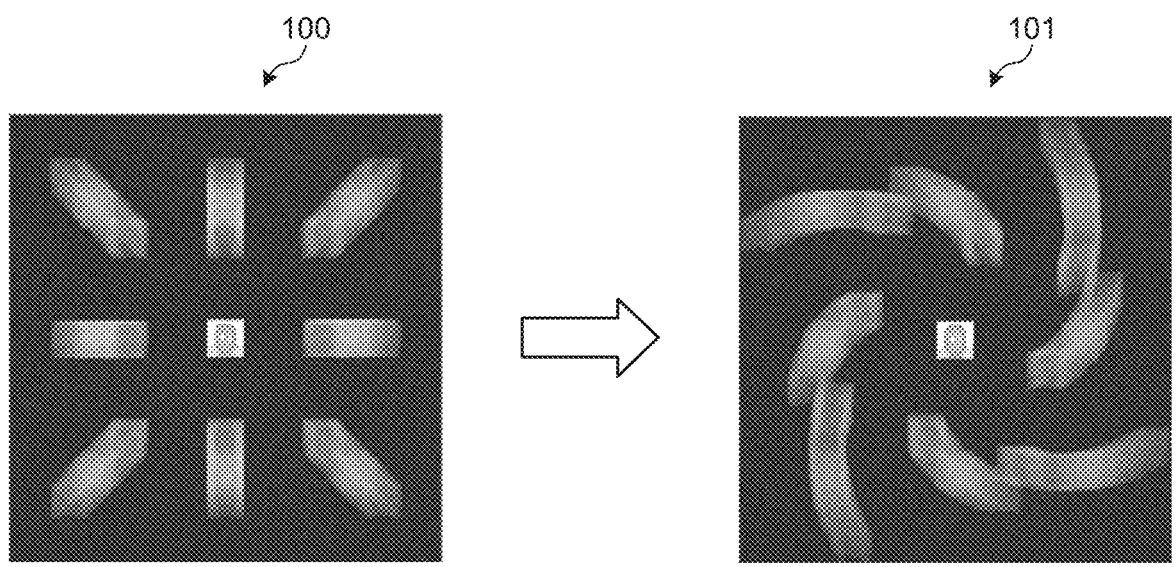
FIG. 24 is a view illustrating examples of a projected image produced on a light receiving surface with a basic diffraction grating and a projected image produced in a case where a modulator according to an embodiment is used.
Figure 25:
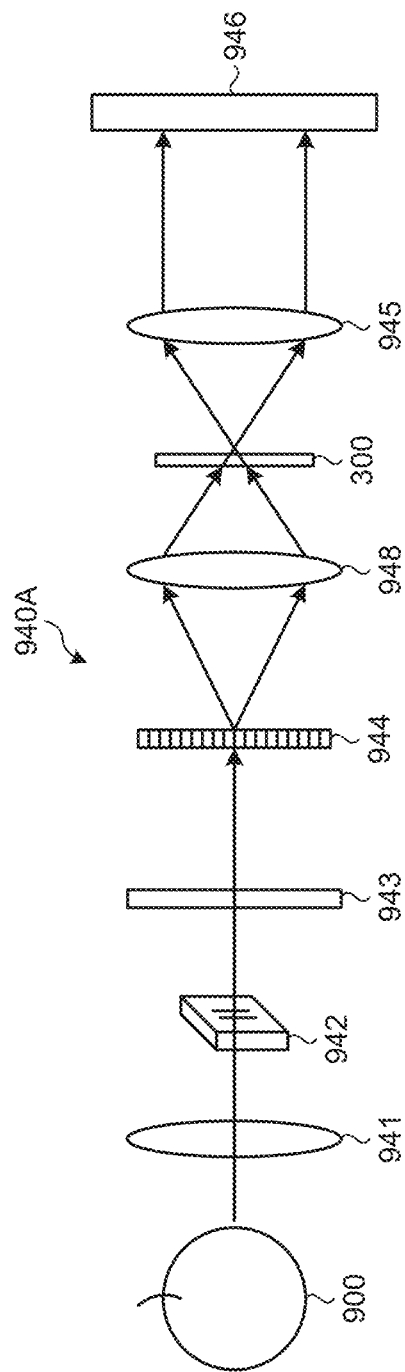
FIG. 25 is a view illustrating a schematic configuration example of a snapshot spectroscopic measurement apparatus according to the embodiment.
Figure 26:
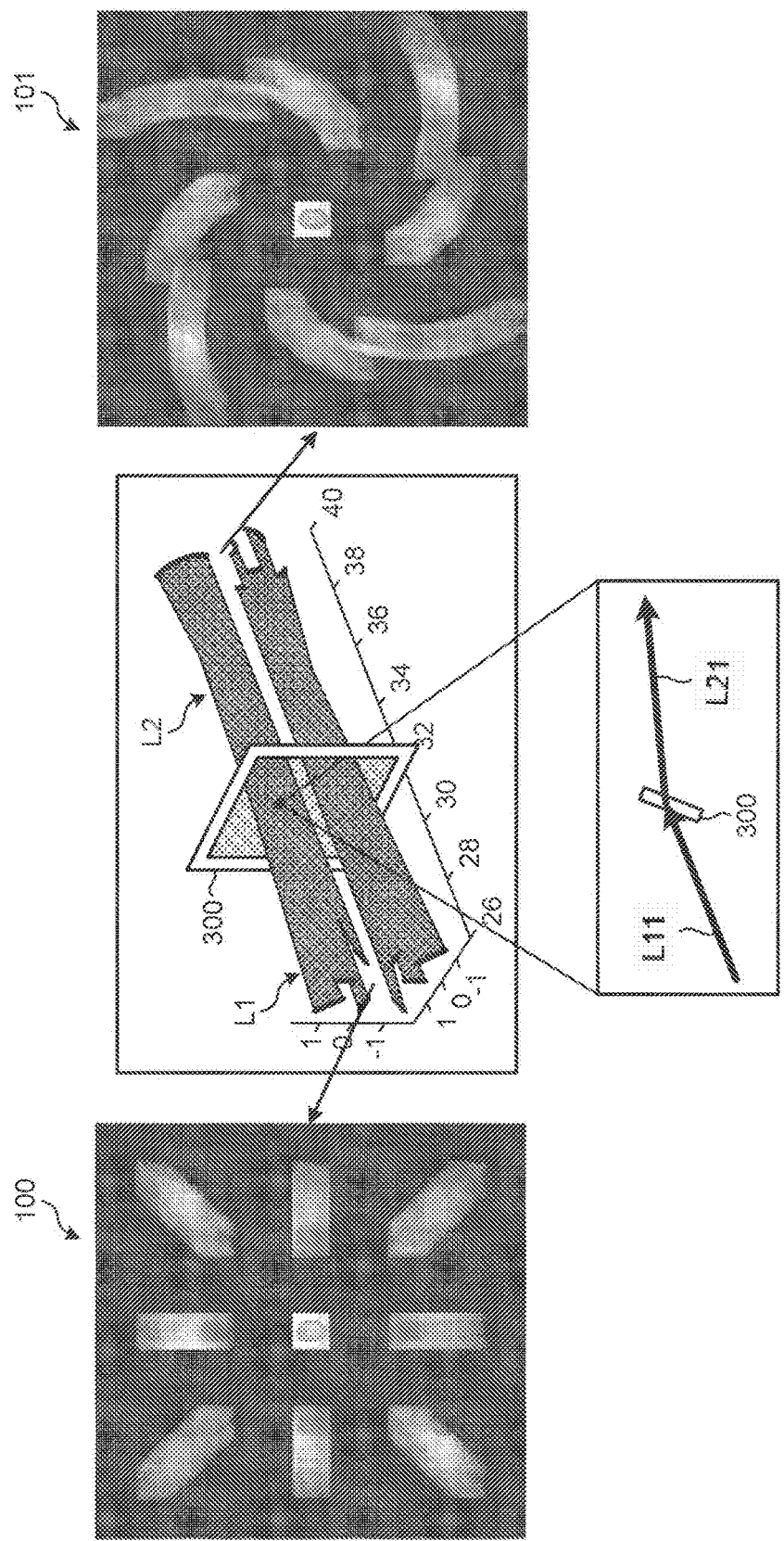
FIG. 26 is a view illustrating an example of a relationship between the modulator of the spectroscopic measurement apparatus according to the embodiment and image data.

FIG. 24 is a view illustrating examples of a projected image produced on a light receiving surface with a basic diffraction grating and a projected image produced in a case where a modulator according to the embodiment is used. FIG. 25 is a view illustrating a schematic configuration example of a snapshot spectroscopic measurement apparatus according to the embodiment. FIG. 26 is a view illustrating an example of a relationship between the modulator of the spectroscopic measurement apparatus according to the embodiment and image data.

In a spectroscopic element in the snapshot spectroscopic measurement apparatus 940, diffraction images are each recorded in a linear shape in image data 100 because of its wavelength (±first-order light, for example) in the image data 100 as illustrated in the left diagram of FIG. 24. Specifically, the diffraction images are linear images of ±first-order light radially recorded around the 0th-order light. Due to this phenomenon, in a sensor space of a finite size, it is difficult to adjust an overlap between the images, which causes reduction of wavelength resolution. Thus, a spectroscopic measurement apparatus 940A according to the embodiment re-bends a light ray emitted from the diffraction grating 944 using a modulator, to change the recording direction of a diffraction image for each wavelength as in image data 101 illustrated in the right diagram of FIG. 24. Additionally, in the present embodiment, for the sake of simplification of the description, a case where the modulator bends a diffraction image of first-order light will be described. However, also diffraction images of light of second order and higher may also be bent in the same manner as that of first-order light.

The spectroscopic measurement apparatus 940A is included in an imaging apparatus, for example. As illustrated in FIG. 25, the spectroscopic measurement apparatus 940A includes the objective lens 941, the slit 942, the collimator lens 943, the diffraction grating 944, a modulation lens 948, a modulator 300, the imaging lens 945, and the area sensor 946. The area sensor 946 is an example of an image sensor.

The modulation lens 948 is a lens that is provided between the diffraction grating 944 and the modulator 300 and organizes diffracted light rays from the diffraction grating 944 according to each wavelength. The modulation lens 948 has a focal length $f_M$, and forms a focal plane in a position at a distance $f_M$ therefrom.

The modulator 300 is provided between the diffraction grating 944 and the area sensor 946. The modulator 300 is provided on an optical path on which a light ray having been transmitted through the diffraction grating 944 is directed toward the area sensor 946. In the embodiment, the modulator 300 is placed in a focal position of the modulation lens 948 on the optical path. The modulator 300 is formed of a transmittable material and has a rectangular outer shape. Examples of the transmittable material include a material having a refractive index such as glass, a synthetic resin, or a polycarbonate resin. Regarding the shape of the modulator 300, the outer shape of the modulator 300 can be a circle, an ellipse, a polygon, or the like, for example.

The modulator 300 receives a light ray (diffracted light ray) directed to the area sensor 946 from the diffraction grating 944. The modulator 300 has a configuration of changing the travel direction of an incident light ray in accordance with Snell's law. The modulator 300 changes the travel direction of a light ray emitted toward the area sensor 946 so as to bend the recording direction of a diffraction image for each wavelength of the light ray on the light receiving surface of the area sensor 946. In other words, the modulator 300 changes the travel direction of a light ray so as to bend the recording direction of a diffraction image on the light receiving surface of the area sensor 946.

For example, as illustrated in FIG. 26, the modulator 300 receives a light-ray group L1 that projects the diffraction image shown in the image data 100 from the diffraction grating 944. The light-ray group L1 is a bundle of light rays that are radially recorded around the 0th-order light as linear diffraction images of ±first-order light. In order to obtain a pattern of diffraction images as in the image data 101, the modulator 300 emits a light ray L21 that is based on a light ray L11 having a wavelength corresponding to the pattern in the incident light-ray group L1 and has a travel direction having been changed from that of the light ray L11. A light-ray group L2 including the light ray L21 is projected on the light receiving surface of the area sensor 946. At that time, the modulator 300 having a refractive index changes the travel direction of the light ray L11 in accordance with Snell's law and emits the light ray L21 that is a modulated light ray, because of design of its surface shape of an incidence position of the light ray L11 that has a single wavelength and a single entry angle for incidence on each point of an incidence plane.

In the example illustrated in FIG. 26, the modulator 300 changes the travel direction of a light ray so as to curve a diffraction image having a wavelength at which the recording direction on the light receiving surface of the area sensor 946 is linear among the wavelengths of the light rays received from the diffraction grating 944. The modulator 300 changes the travel direction of a light ray so as to change a diffraction image of the first-order light without changing a diffraction image of the 0th-order light. In other words, the modulator 300 can change diffraction images of light of first order and higher or can change a diffraction image of light of a specific order.

The modulator 300 changes the travel direction of a light ray such that the bent diffraction image is fit in the light receiving surface of the area sensor 946. For example, as illustrated in the image data 101 of FIG. 26, the modulator 300 changes the travel direction of a light ray such that a diffraction image of the first-order light has a shape of a curve that fits in the light receiving surface. The modulator 300 changes the travel direction of a light ray so as to suppress superimposition of the bent diffraction image on another diffraction image. For example, the modulator 300 changes the travel direction of a light ray such that a plurality of diffraction images of first-order light do not overlap each other.

In the present embodiment, the surface shape of the modulator 300 is designed such that a part corresponding to a diffraction image that is to be bent on the light receiving surface of the area sensor 946 is convex. An example of a method of designing the surface shape of the modulator 300 will be described later.

Returning to FIG. 25, an example of the operation of the spectroscopic measurement apparatus 940A will be described. In the spectroscopic measurement apparatus 940A, light from the measured object 900 is focused by the objective lens 941, is further converted into parallel light by the collimator lens 943 via the slit 942, and is transmitted through the diffraction grating 944. The spectroscopic measurement apparatus 940A has a configuration of transmitting a light ray having been transmitted through the diffraction grating 944 through the modulation lens 948 and the modulator 300, thereby projecting the light ray whose travel direction has been changed, on the light receiving surface of the area sensor 946 via the imaging lens 945.

With the above-described configuration, in the spectroscopic measurement apparatus 940A, light rays of different wavelength components from different points on the measured object 900 are recorded in different elements (pixels) in the light receiving surface of the area sensor 946. Because of inclusion of the modulator 300, the spectroscopic measurement apparatus 940A can change the recording direction of a diffraction image for each wavelength from a straight line to a curve.

3.2 Arrangement of Modulator

Figure 27:
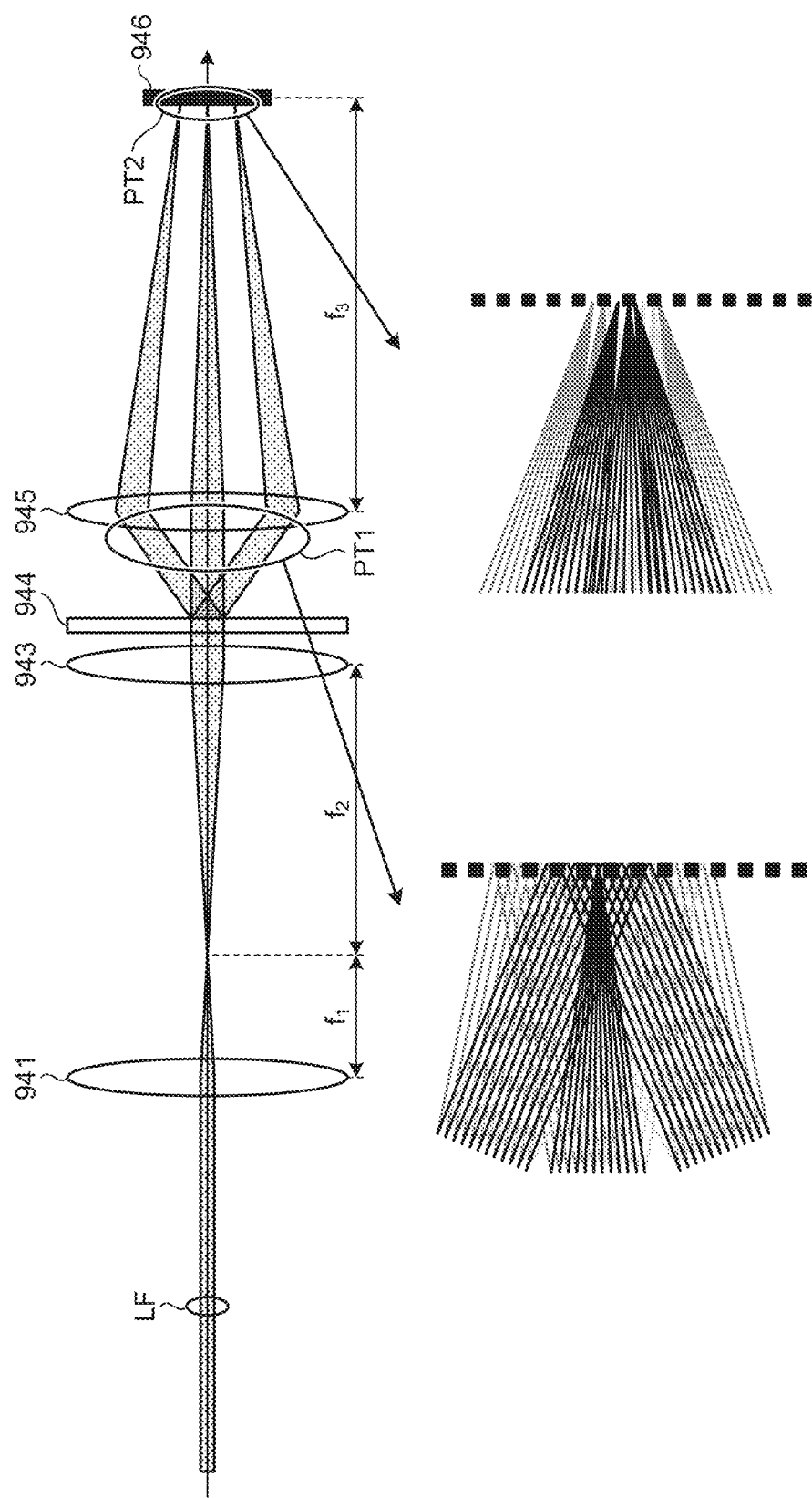
FIG. 27 is a view for explaining a light ray in a conventional snapshot spectroscopic measurement apparatus.

For the spectroscopic measurement apparatus 940A to change (modulate) the travel direction of a light ray using the modulator 300, the position where the modulator 300 is placed is important. An example of a light ray in the conventional spectroscopic measurement apparatus not including the modulator 300 will be described with reference to FIG. 27. FIG. 27 is a view for explaining a light ray in the conventional snapshot spectroscopic measurement apparatus.

As illustrated in FIG. 27, the conventional spectroscopic measurement apparatus includes the objective lens 941 having a focal length $f_1$, the collimator lens 943 having a focal length $f_2$, the diffraction grating 944, the imaging lens 945 having a focal length $f_3$, and the area sensor 946. In the conventional spectroscopic measurement apparatus, a light-ray group LF passes through the objective lens 941. In the conventional spectroscopic measurement apparatus, between the diffraction grating 944 and the imaging lens 945, color mixture is caused in diffracted light as indicated by a portion PT1, and color mixture is caused also in a plurality of angled light rays. For this reason, in a case where the modulator 300 is provided between the diffraction grating 944 and the imaging lens 945, a plurality of light rays having different wavelengths and different entry angles converge at a single point on the incidence plane, and thus it is difficult to apply appropriate modulation. Further, in the conventional spectroscopic measurement apparatus, between the imaging lens 945 and the area sensor 946, while no color mixture is caused in diffracted light as indicated by a portion PT2, color mixture is caused in a plurality of angled light rays. In the conventional spectroscopic measurement apparatus, diffracted light rays are focused onto a focal point in the position of the light receiving surface of the area sensor 946, and the light rays are organized according to each wavelength.

In view of this, in the spectroscopic measurement apparatus 940A according to the embodiment, a range of an entry angle is narrowed, whereby a light ray incident on a single point of the modulator 300 can be caused to have a single wavelength and a substantially single entry angle, and the above-described modulation can be applied.

Figure 28:
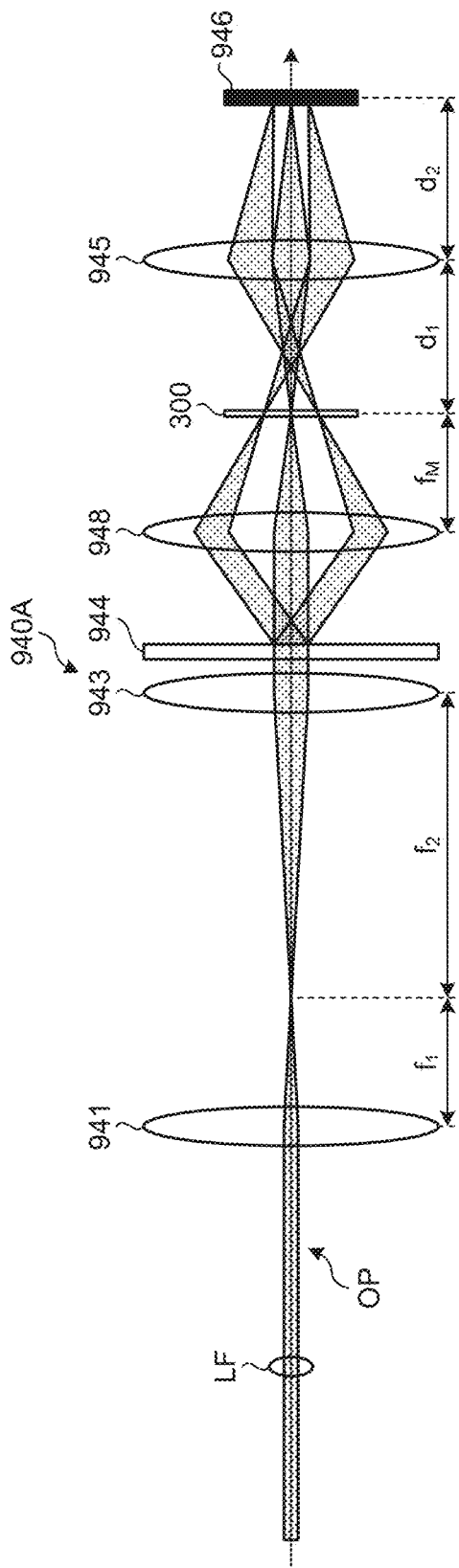
FIG. 28 is a view for explaining an arrangement example in the spectroscopic measurement apparatus according to the embodiment.

FIG. 28 is a view for explaining an arrangement example in the spectroscopic measurement apparatus 940A according to the embodiment. In the spectroscopic measurement apparatus 940A, the modulation lens 948 and the modulator 300 are arranged on an optical path OP as illustrated in FIG. 28 in order to organize diffracted light rays that have passed through the diffraction grating 944 according to each wavelength as described above. Additionally, in FIG. 28, illustration of the slit 942 is omitted. In the spectroscopic measurement apparatus 940A, the modulation lens 948 having a focal length $f_M$ is placed immediately behind the diffraction grating 944 on the optical path OP, and a focal plane is formed in a position at a distance $f_M$ from the modulation lens 948. The spectroscopic measurement apparatus 940A modulates the travel direction of a light ray of each wavelength in the light-ray group LF by having the modulator 300 placed in the focal plane of the modulation lens 948. In the spectroscopic measurement apparatus 940A, a distance between the modulator 300 and the imaging lens 945 is $d_1$, and a distance between the imaging lens 945 and the area sensor 946 is $d_2$. The distance $d_2$ can be expressed by the following equation (6).

$$d_2 = \frac{1}{\left(\frac{1}{f_3} - \frac{1}{d_1}\right)} \quad (6)$$

In the above equation (6), $f_3$ represents a focal length of the imaging lens 945.

In the spectroscopic measurement apparatus 940A, the modulator 300 performs modulation in the focal plane of the modulation lens 948, thereby producing the same effects as those produced in a case where modulation is performed by the modulator 300 placed in the position of the light receiving surface of the area sensor 946.

3.3 Design Example of Modulator

Figure 29:
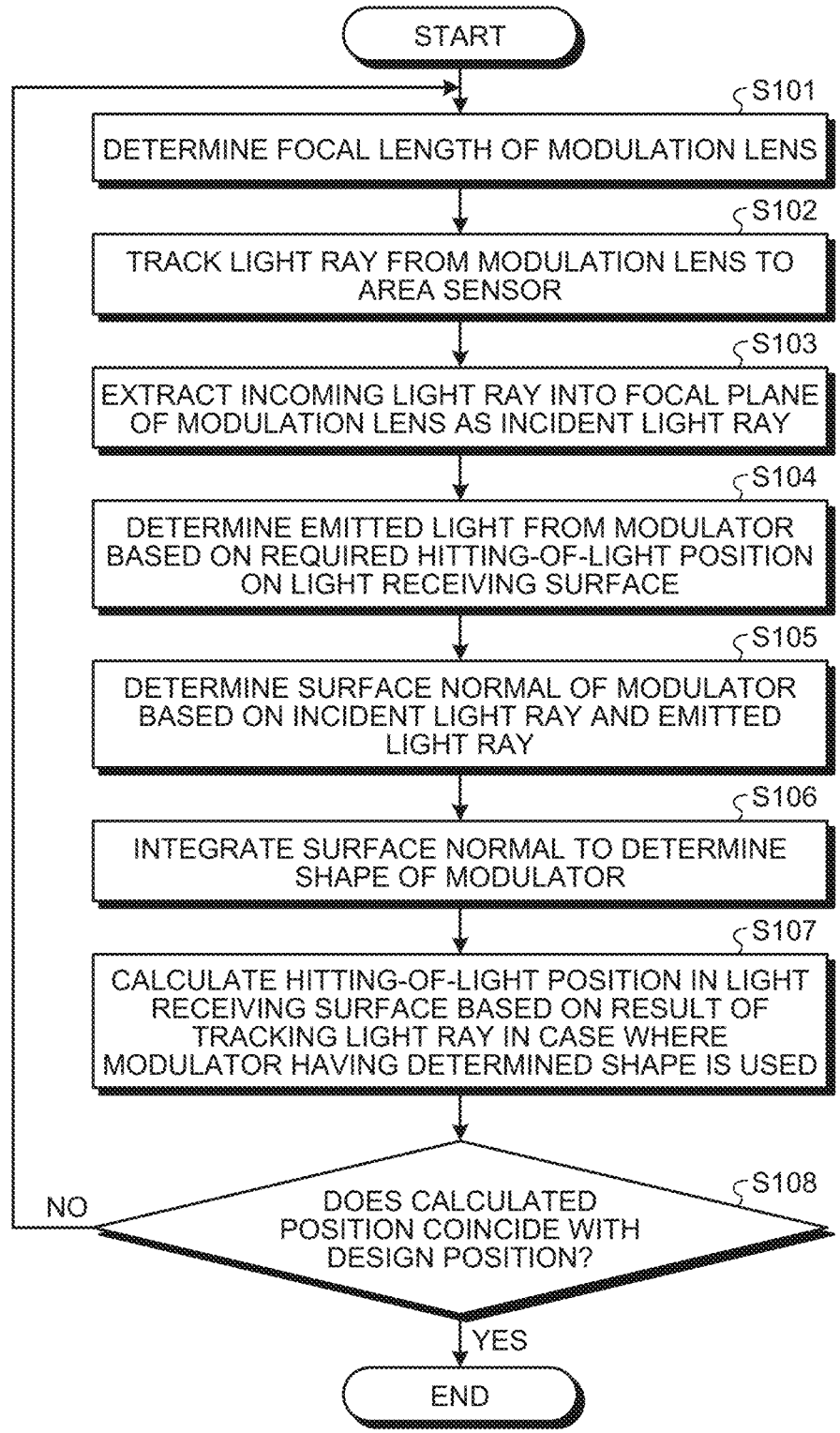
FIG. 29 is a flowchart illustrating a procedure of a design method of the modulator according to the embodiment.
Figure 30:
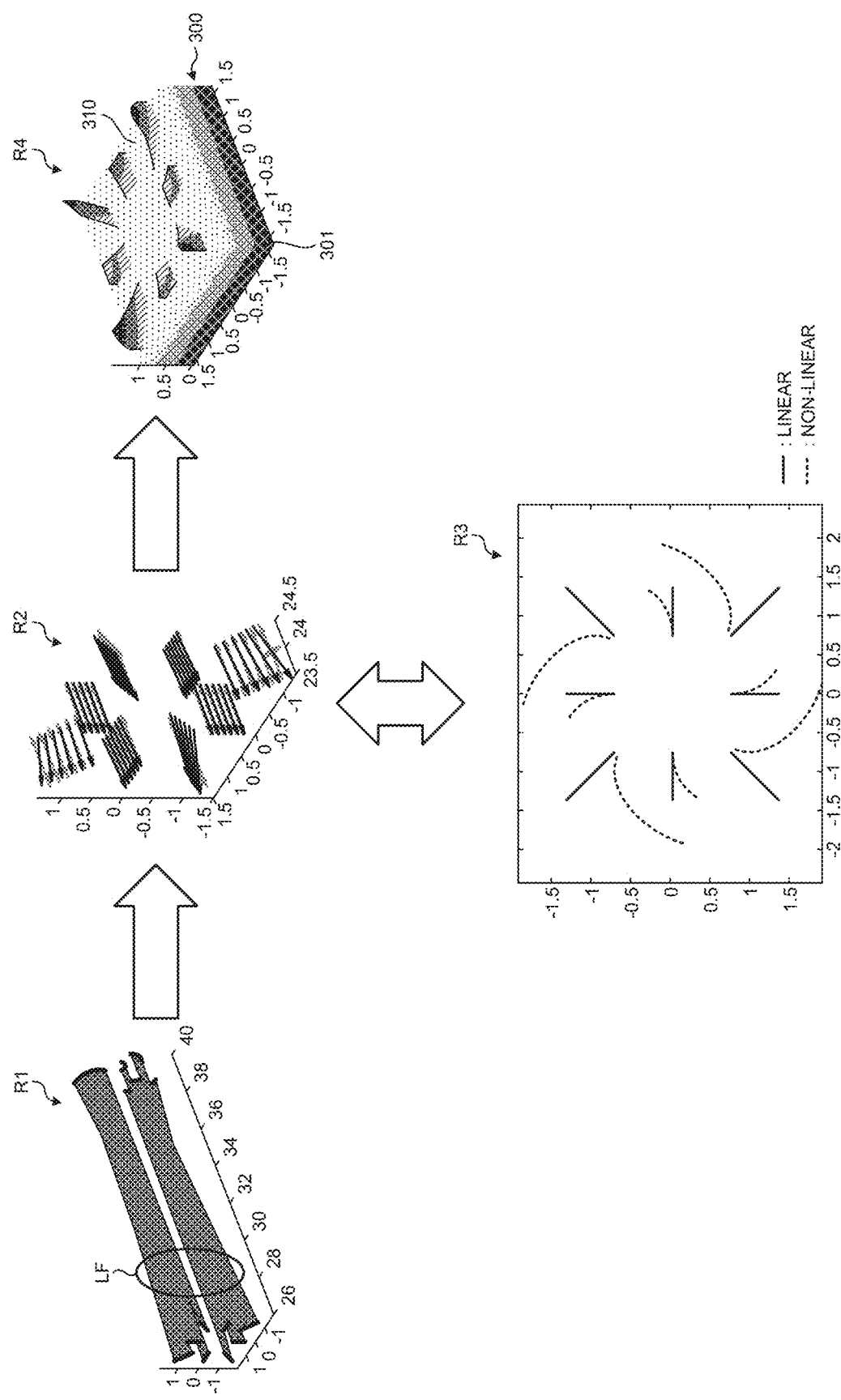
FIG. 30 is a view for explaining an example of the design method of the modulator according to the embodiment.

FIG. 29 is a flowchart illustrating a procedure of a design method of the modulator 300 according to the embodiment. FIG. 30 is a view for explaining an example of the design method of the modulator 300 according to the embodiment. The design method illustrated in FIG. 29 is a method of designing the modulator 300 that changes the travel direction of the incident light-ray group LF in accordance with Snell's law. The design method is performed by a computer, a dedicated electronic apparatus, or the like, for example. In the present embodiment, a case where the design method is performed by a computer will be described.

In the design method illustrated in FIG. 29, the computer determines a focal length of the modulation lens 948 (step S101). The computer tracks a light ray from the modulation lens 948 to the area sensor 946 (step S102). For example, the computer carries out a simulation, an application, or the like, to track the behavior of the light ray in a space extending from the modulation lens 948 to the area sensor 946. As indicated by R1 in FIG. 30, the computer obtains a result of tracking the light-ray group LF from the modulation lens 948 to the area sensor 946.

Returning to FIG. 29, the computer extracts an incoming light ray into the focal plane of the modulation lens 948 as an incident light ray (step S103). For example, the computer calculates a required surface normal of the modulator 300 in accordance with Snell's law based on an incident light ray on the focal plane of the modulation lens illustrated in FIG. 28 and an output light ray of the modulator 300 that is calculated from a required hitting-of-light position in the light receiving surface as indicated by R2 in FIG. 30. The hitting-of-light position includes a nonlinear portion indicated by broken lines in a graph indicated by R3 in FIG. 30, for example.

Returning to FIG. 29, the computer determines an emitted light from the modulator 300 based on the required hitting-of-light position in the light receiving surface (step S104). The computer determines a surface normal of the modulator 300 based on the incident light ray and the emitted light ray (step S105). The computer integrates the surface normal to determine the shape of the modulator 300 (step S106). For example, as indicated by R4 in FIG. 30, the computer determines a surface shape 310 of one surface of a main body 301 of the modulator 300. The surface shape 310 is, for example, that of an incidence plane of the main body 301, and is a shape in which a portion corresponding to the non-linearity of a light ray protrudes. Additionally, the surface shape 310 may be that of the emission surface of the main body 301, or may be a surface shape formed of a combination of those of an incidence plane and an emission surface of the main body 301.

Returning to FIG. 29, the computer calculates the hitting-of-light position in the light receiving surface based on the result of tracking the light ray in a case where the modulator 300 having the determined shape is used (step S107). For example, the computer carries out a simulation, an application, or the like, to track the behavior of the light ray in a space extending from the modulation lens 948 to the area sensor 946 in a case where the determined modulator 300 is used.

The computer determines whether or not the calculated hitting-of-light position coincides with a design position (step S108). The design position includes, for example, the hitting-of-light position in the designed light receiving surface in a case where the modulator 300 is used. When it is determined that the calculated hitting-of-light position does not coincide with the design position (No in step S108), the computer returns the process back to the step S101 having been described above and performs the series of procedure again because the surface shape of the modulator 300 is not suitable for the spectroscopic measurement apparatus 940A. On the other hand, when it is determined that the calculated hitting-of-light position coincides with the design position (Yes in step S108), the computer stores the design result into a storage unit or the like and ends the procedure illustrated in FIG. 29 because the surface shape of the modulator 300 is suitable for the spectroscopic measurement apparatus 940A.

According to the present technique, the modulator 300 changes the travel direction of an incident light ray in accordance with Snell's law. In the design method, as illustrated in FIG. 29, first, the behavior of a light ray in a space from the modulation lens 948 to the area sensor 946 is obtained by light-ray tracking. Subsequently, in the design method, based on an incident light ray on the focal plane of the modulation lens 948 in FIG. 28 and an output light ray of the modulator 300 that is calculated from a required hitting-of-light position in the light receiving surface, such as a nonlinear sequence of points indicated by R3 in FIG. 30, a required surface normal of the modulator 300 is calculated in accordance with Snell's law. In the design method, the surface normal that has been calculated most lately is integrated, and a required surface shape of the modulator 300 is generated. In this manner, the design method of the modulator 300 can design the surface shape 310 suitable for projecting a bent refracted image on the light receiving surface of the area sensor 946. As a result, the design method can provide the modulator 300 that can more efficiently use the imaging area of the area sensor 946 and improve the wavelength resolution.

3.4 Simulation Result

Next, a result of simulation carried out on a snapshot spectroscopic measurement apparatus 460 using the modulator 300 according to the present embodiment will be described. FIG. 31 is a view illustrating a result of simulation of the spectroscopic measurement apparatus 460 according to the embodiment.

In the simulation, a simulation is carried out on the spectroscopic measurement apparatus 460 using the modulator 300 having the surface shape 310 by which the recording direction of a diffraction image for each wavelength of a light ray is changed to a curve as in image data 102 in the left diagram of FIG. 31. The simulation shows that a result of projection of light rays that are provided from different points and have different wavelength components in input data 510 onto the light receiving surface of the area sensor 946 via the modulator 300 is obtained as restored data 520.

The input data 510 has 260×260 pixels and a wavelength of 301 nm, for example. The restored data 520 has 60×60 pixels and a wavelength of 30 nm, for example. The restored data 520 is, for example, data that is restored by having been subjected to a binary matrix operation using a modulation matrix prepared in advance. A graph 531 indicates a relationship between a relative intensity of a pixel 511 in the input data 510 and the wavelength λ, and indicates a true value. A graph 532 indicates a relationship between a relative intensity of a pixel 521 in the restored data 520 and the wavelength λ. The graph 531 and the graph 532 indicate that a difference between the two peak values is 50 nm. Comparing the graph 531 and the graph 532 shows that those are similar to each other and the design has no problem. Further, the result of simulation in a case where the modulator 300 is used indicates that the wavelength resolution can be significantly improved as compared with a case where the modulator 300 is not used.

3.5 Operations and Effects

As described above, according to the present embodiment, the modulator 300 is provided between the diffraction grating 944 and the area sensor 946 in the spectroscopic measurement apparatus 940A. Because of this, a light ray diffracted by the diffraction grating 944 is modulated so that a diffraction image on the light receiving surface of the area sensor 946 can be bent. Thus, the modulator 300 can make a diffraction image for each wavelength of the light ray on the light receiving surface of the area sensor 946 larger than a linear diffraction image. Thus, the modulator 300 can more efficiently use the imaging area of the area sensor 946 and improve the wavelength resolution.

The modulator 300 can change the travel direction of a light ray so as to curve a diffraction image having a wavelength at which the recording direction on the light receiving surface of the area sensor 946 is linear among the wavelengths of light rays received from the diffraction grating 944. As a result, the modulator 300 can increase the size of the diffraction image having a specific wavelength, thereby further improving the wavelength resolution.

The modulator 300 can change the travel direction of a light ray from the diffraction grating 944 such that the bent diffraction image is fit in the light receiving surface of the area sensor 946. As a result, the modulator 300 can effectively use the light receiving surface without allowing the diffraction image to extend off the light receiving surface of the area sensor 946, thereby further improving the wavelength resolution.

The modulator 300 can change the travel direction of a light ray from the diffraction grating 944 so as to suppress superimposition of the bent diffraction image and another diffraction image in the light receiving surface of the area sensor 946. As a result, the modulator 300, which suppresses superimposition of the diffraction images on each other, can loosen a relationship between the spatial resolution and the wavelength resolution.

In the modulator 300, the main body 301 has an incidence plane formed in the shape of an incidence position based on the refractive index and a light ray that is incident on a single point and has a single wavelength and a single incident angle. A single point is, for example, a point at which light rays are focused on the surface where the modulator 300 is placed. As a result, the modulator 300 can modulate the light rays focused on the incidence plane, thereby further improving the wavelength resolution.

Because of inclusion of the modulator 300, the spectroscopic measurement apparatus 940A can modulate a light ray diffracted by the diffraction grating 944 so as to bend a diffraction image on the light receiving surface of the area sensor 946. Thus, the spectroscopic measurement apparatus 940A can make a diffraction image for each wavelength of a light ray on the light receiving surface of the area sensor 946 larger than a linear diffraction image. As a result, because of inclusion of the modulator 300 in its configuration, the spectroscopic measurement apparatus 940A can more efficiently use the imaging area of the area sensor 946 and improve the wavelength resolution.

In the spectroscopic measurement apparatus 940A, the modulation lens 948 can be placed in the subsequent stage of the diffraction grating 44 on the optical path, and the modulator 300 can be placed in the focal position of the modulation lens 948. Thus, in the spectroscopic measurement apparatus 940A, though the modulator 300 is not placed in the vicinity of the area sensor 946, light rays similar to light rays of each wavelength that are focused on the light receiving surface of the area sensor 946 can be focused on the modulator 300 by the modulation lens 948. As a result, the spectroscopic measurement apparatus 940A can change the traveling direction of light rays organized according to each wavelength by using the modulator 300, thereby further improving the wavelength resolution.

3.6 Modification of the Embodiment

A spectroscopic measurement apparatus according to a modification of the embodiment will be described. As described above, in the conventional spectroscopic measurement apparatus, diffracted light rays are focused onto a focal point in the position of the light receiving surface of the area sensor 946, and the light rays are organized according to each wavelength. Thus, the modification of the embodiment will discuss an example of a spectroscopic measurement apparatus 940B in which the above-described arrangement of the modulator 300 is changed from the arrangement in the spectroscopic measurement apparatus 940A.

Figure 32:
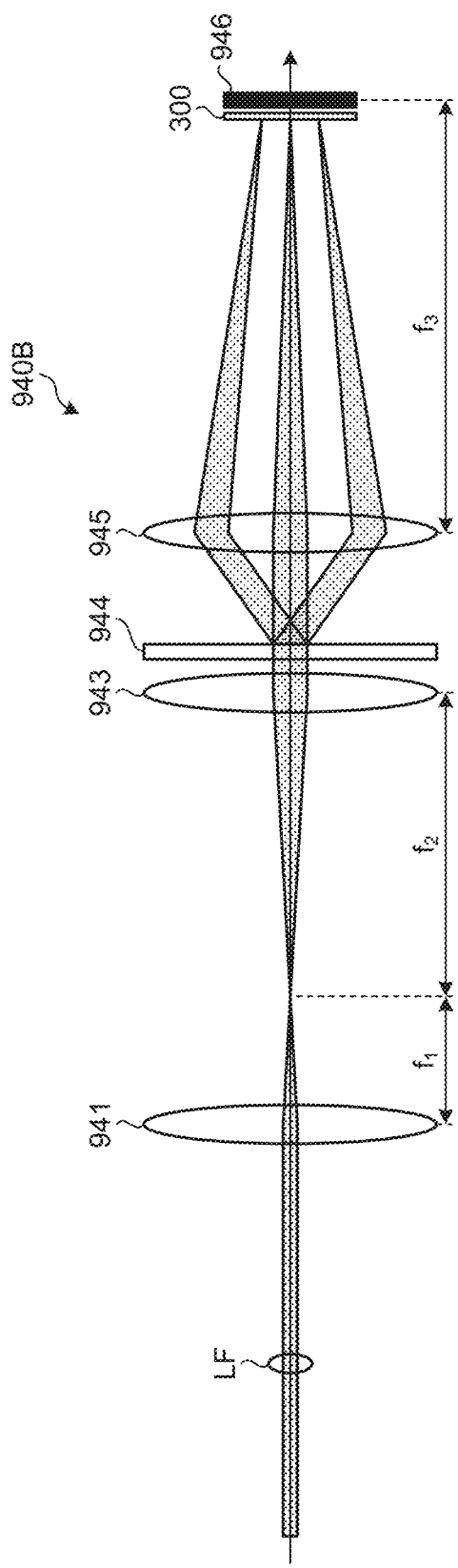
FIG. 32 is a view for explaining an arrangement example in a spectroscopic measurement apparatus according to a modification of the embodiment.

FIG. 32 is a view for explaining an arrangement example in the spectroscopic measurement apparatus 940B according to the modification of the embodiment. As illustrated in FIG. 32, the spectroscopic measurement apparatus 940B, like the above-described spectroscopic measurement apparatus 940A, is a snapshot apparatus. The spectroscopic measurement apparatus 940B includes the objective lens 941 having a focal length $f_1$, the collimator lens 943 having a focal length $f_2$, the diffraction grating 944, the imaging lens 945 having a focal length $f_3$, the modulator 300, and the area sensor 946. Then, the spectroscopic measurement apparatus 940B does not include the modulation lens 948 that is included in the above-described spectroscopic measurement apparatus 940A, thereby simplifying the configuration.

The modulator 300 is placed within a second distance of the light receiving surface of the area sensor 946 so as to be positioned in the focal plane of the imaging lens 945. For example, the modulator 300 can be placed on the light receiving surface of the area sensor 946 or in the vicinity of the light receiving surface.

The modulator 300 receives light rays (diffracted light rays) that are organized according to each wavelength and are directed to the area sensor 946 from the imaging lens 945. The modulator 300 has a configuration of changing the travel direction of an incident light ray in accordance with Snell's law. The modulator 300 changes the travel direction of a light ray emitted toward the area sensor 946 so as to bend the recording direction of a diffraction image for each wavelength of the light ray on the light receiving surface of the area sensor 946. In other words, the modulator 300 changes the travel direction of a light ray so as to bend the recording direction of a diffraction image on the light receiving surface of the area sensor 946.

Next, an example of the operation of the spectroscopic measurement apparatus 940B will be described. In the spectroscopic measurement apparatus 940B, light from the measured object 900 is focused by the objective lens 941, is further converted into parallel light by the collimator lens 943 via the slit 942, and is transmitted through the diffraction grating 944. In the spectroscopic measurement apparatus 940B, the light ray having been transmitted through the diffraction grating 944 is imaged by the imaging lens 945 and is focused on the modulator 300. In the spectroscopic measurement apparatus 940B, the modulator 300 transmits the light ray, so that the light ray whose travel direction has been changed is projected on the light receiving surface of the area sensor 946.

With the above-described configuration, in the spectroscopic measurement apparatus 940B, light rays of different wavelength components from different points on the measured object 900 are recorded in different elements (pixels) on the light receiving surface of the area sensor 946. Though the modulator 300 is placed within a second distance of the light receiving surface of the area sensor 946, the spectroscopic measurement apparatus 940B can change the recording direction of the diffraction image for each wavelength from a straight line to a curve, similarly to the above-described spectroscopic measurement apparatus 940A. Further, in the spectroscopic measurement apparatus 940B, the modulator 300 is placed within a second distance of the light receiving surface of the area sensor 946 so as to be positioned in the focal plane of the imaging lens 945. This eliminates a need for the modulation lens 948 described above. Therefore, the spectroscopic measurement apparatus 940B can have a simpler configuration than that of the spectroscopic measurement apparatus 940A.

3.7 Design Example of Modulator According to the Modification of the Embodiment

Figure 33:
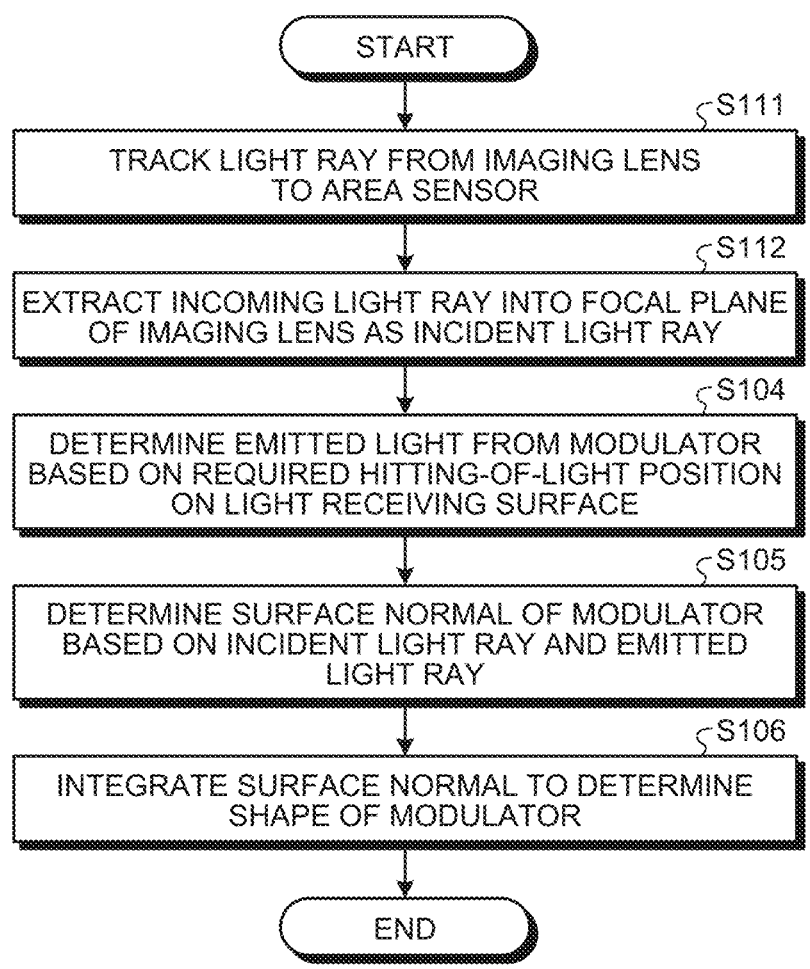
FIG. 33 is a flowchart illustrating a procedure of a design method of a modulator according to the modification of the embodiment.

FIG. 33 is a flowchart illustrating a procedure of a design method of the modulator 300 according to the modification of the embodiment. The design method illustrated in FIG. 33 is a modification of the above-described design method illustrated in FIG. 29.

According to the design method illustrated in FIG. 33, a computer tracks a light ray from the imaging lens 945 to the area sensor 946 (step S111). For example, the computer carries out a simulation, an application, or the like, to track the behavior of a light ray in a space extending from the imaging lens 945 to the area sensor 946.

The computer extracts an incoming light ray into the focal plane of the imaging lens 945 as an incident light ray (step S112). For example, the computer calculates a required surface normal of the modulator 300 in accordance with Snell's law based on an incident light ray on the focal plane of the imaging lens 945 and an output light ray of the modulator 300 that is calculated from a required hitting-of-light position in the light receiving surface of the area sensor 946.

The computer determines an emitted light from the modulator 300 based on the required hitting-of-light position in the light receiving surface (step S104). The computer determines a surface normal of the modulator 300 based on the incident light ray and the emitted light ray (step S105). The computer integrates the surface normal to determine the shape of the modulator 300 (step S106). The computer stores the result of design that determines the shape of the modulator 300 into a storage device or the like, and ends the procedure illustrated in FIG. 33.

In the procedure of the design method illustrated in FIG. 33, the step S101 illustrated in FIG. 29 is unnecessary because the spectroscopic measurement apparatus 940B does not include the modulation lens 948. Further, in the procedure of the design method illustrated in FIG. 33, the need to perform the steps S107 and S108 illustrated in FIG. 29 is eliminated by placement of the modulator 300 in the vicinity of the light receiving surface of the area sensor 946 in the spectroscopic measurement apparatus 940B. As a result, the design method illustrated in FIG. 33 can simplify the procedure as compared with the design method illustrated in FIG. 29.

According to the present technique, the modulator 300 changes the travel direction of an incident light ray in accordance with Snell's law. In the design method, first, the behavior of a light ray in a space from the imaging lens 945 to the area sensor 946 is obtained by light-ray tracking. Subsequently, in the design method, a required surface normal of the modulator 300 is calculated in accordance with Snell's law based on an incident light ray on the focal plane of the imaging lens 945 and an output light ray of the modulator 300 that is calculated from a required hitting-of-light position in the light receiving surface of the area sensor 946. In the design method, the surface normal that has been calculated most lately is integrated, and a required surface shape of the modulator 300 is generated. In this manner, the design method of the modulator 300 can design the surface shape 310 suitable for projecting a bent refracted image on the light receiving surface of the area sensor 946. As a result, the design method can provide the modulator 300 that can more efficiently use the imaging area of the area sensor 946 and improve the wavelength resolution.

3.8 Example of Application to Mobile Unit

The technique according to the present disclosure (present technique) can be applied to various products. For example, the technique according to the present disclosure may be implemented in the form of an apparatus mounted on any type of mobile unit such as an automobile, an electric vehicle, a hybrid electric vehicle, a motorcycle, a bicycle, a personal mobility vehicle, an airplane, a drone, a ship, or a robot.

Figure 34:
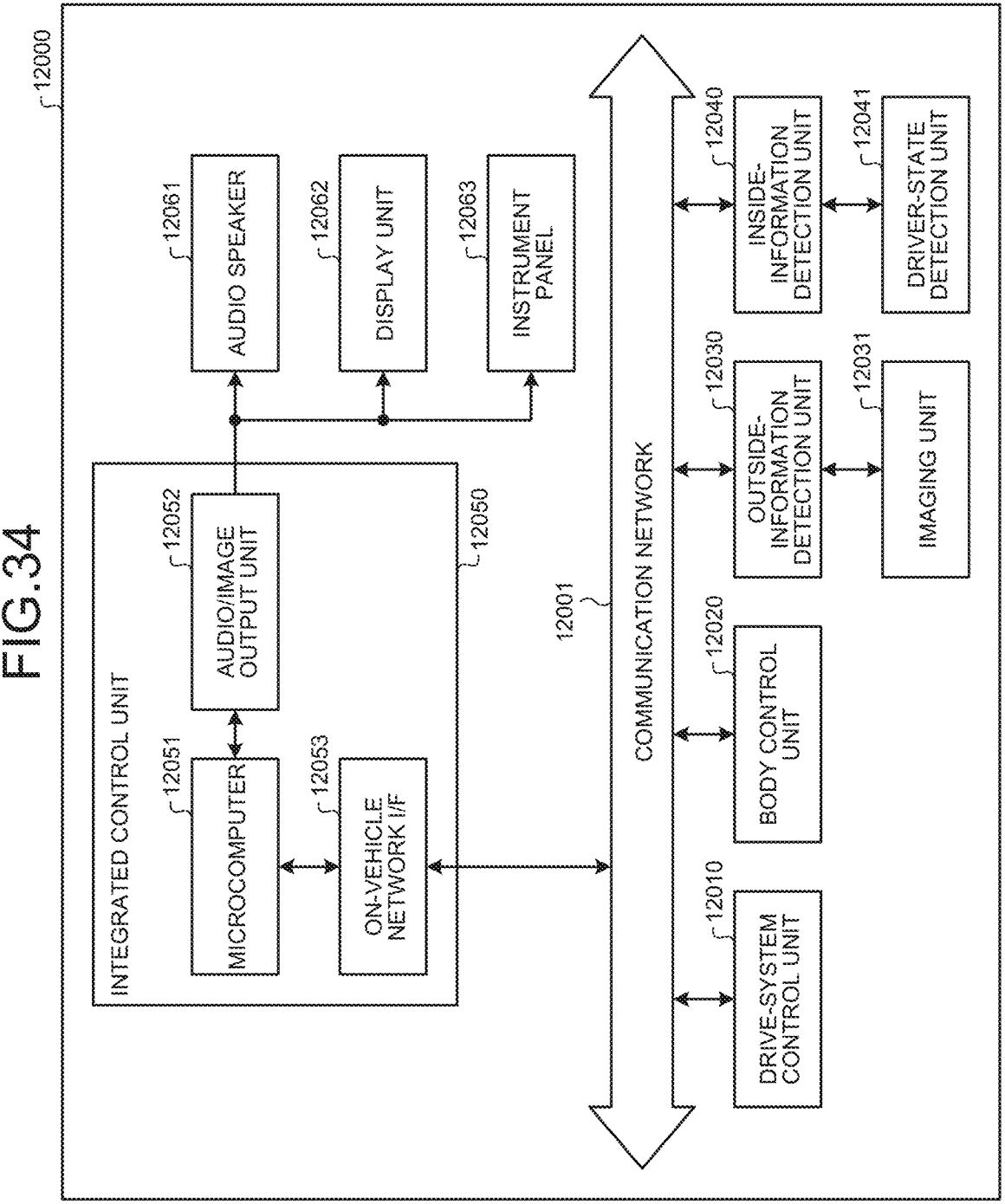
FIG. 34 is a block diagram illustrating a schematic configuration example of a vehicle control system that is an example of a mobile-unit control system to which the technique according to the present disclosure is applicable.

FIG. 34 is a block diagram illustrating a schematic configuration example of a vehicle control system that is one example of a mobile-unit control system to which the technique according to the present disclosure is applicable.

A vehicle control system 12000 includes a plurality of electronic control units connected via a communication network 12001. In the example illustrated in FIG. 34, the vehicle control system 12000 includes a drive-system control unit 12010, a body control unit 12020, an outside-information detection unit 12030, an inside-information detection unit 12040, and an integrated control unit 12050. Further, as functional components of the integrated control unit 12050, a microcomputer 12051, an audio/image output unit 12052, and an on-vehicle network interface (I/F) 12053 are illustrated.

The drive-system control unit 12010 controls the operations of devices related to a drive system of a vehicle according to various programs. For example, the drive-system control unit 12010 functions as a controller for a driving-force generation device for generating driving force of the vehicle such as an internal combustion engine or a driving motor, a driving-force transmission mechanism for transmitting driving force to wheels, a steering mechanism for adjusting a steering angle of the vehicle, a braking device for generating braking force of the vehicle, and the like.

The body control unit 12020 controls the operations of various devices mounted in a vehicle body according to various programs. For example, the body control unit 12020 functions as a controller for a keyless entry system, a smart key system, a power window device, or various lamps such as a head lamp, a back lamp, a brake lamp, a blinker, or a fog lamp. In this case, radio waves transmitted from a portable device that substitutes for a key, or signals of various switches, can be input to the body control unit 12020. The body control unit 12020 receives inputs of these radio waves or signals, and controls a door locking device, a power window device, lamps, and the like of the vehicle.

The outside-information detection unit 12030 detects information about the outside of a vehicle having the vehicle control system 12000 mounted thereon. For example, the outside-information detection unit 12030 is connected to an imaging unit 12031. The outside-information detection unit 12030 causes the imaging unit 12031 to capture an image of the outside of the vehicle, and receives the captured image. The outside-information detection unit 12030 may perform an object detection process or a distance detection process for a person, a vehicle, an obstacle, a sign, a character on a road surface, and the like, based on the received image.

The imaging unit 12031 is an optical sensor that receives light and outputs an electric signal corresponding to the amount of the received light. The imaging unit 12031 can output the electric signal in the form of an image or can output the electric signal in the form of distance-measurement information. Further, light received by the imaging unit 12031 may be visible light or invisible light such as infrared radiation.

The inside-information detection unit 12040 detects information about the inside of a vehicle. For example, the inside-information detection unit 12040 is connected to a driver-state detection unit 12041 that detects the state of a driver. The driver-state detection unit 12041 includes, for example, a camera that captures an image of a driver. The inside-information detection unit 12040 may calculate the degree of fatigue or the degree of concentration of the driver or may determine whether or not the driver is dozing off, based on detection information input from the driver-state detection unit 12041.

The microcomputer 12051 can calculate a control target value of the driving-force generation device, the steering mechanism, or the braking device based on the information about the outside and the inside of the vehicle acquired by the outside-information detection unit 12030 or the inside-information detection unit 12040, and output a control command to the drive-system control unit 12010. For example, the microcomputer 12051 can perform cooperative control for the purpose of implementing functions of an advanced driver assistance system (ADAS) including avoidance of collision of the vehicle or alleviation of impact on the vehicle, follow-up travel by referring to an inter-vehicle distance, constant-speed travel, warning of collision of the vehicle, warning of lane departure of the vehicle, and the like.

Further, the microcomputer 12051 controls the driving-force generation device, the steering mechanism, the braking device, or the like based on information about surroundings of the vehicle acquired by the outside-information detection unit 12030 or the inside-information detection unit 12040, to perform cooperative control for the purpose of automatic driving or the like in which the vehicle autonomously travels without depending on the operation of the driver.

Moreover, the microcomputer 12051 can output a control command to the body control unit 12020 based on information that is about the outside of the vehicle and is acquired by the outside-information detection unit 12030. For example, the microcomputer 12051 controls a head lamp in accordance with the position of a preceding vehicle or an oncoming vehicle detected by the outside-information detection unit 12030, to perform cooperative control for the purpose of preventing glare by an operation such as a beam changing operation from high to low.

The audio/image output unit 12052 transmits at least one of an audio output signal and an image output signal to an output device capable of visually or audibly notifying a passenger of the vehicle or the outside of the vehicle of information. In the example of FIG. 34, an audio speaker 12061, a display unit 12062, and an instrument panel 12063 are illustrated as examples of the output device. The display unit 12062 may include, for example, at least one of an on-board display and a head-up display.

Figure 35:
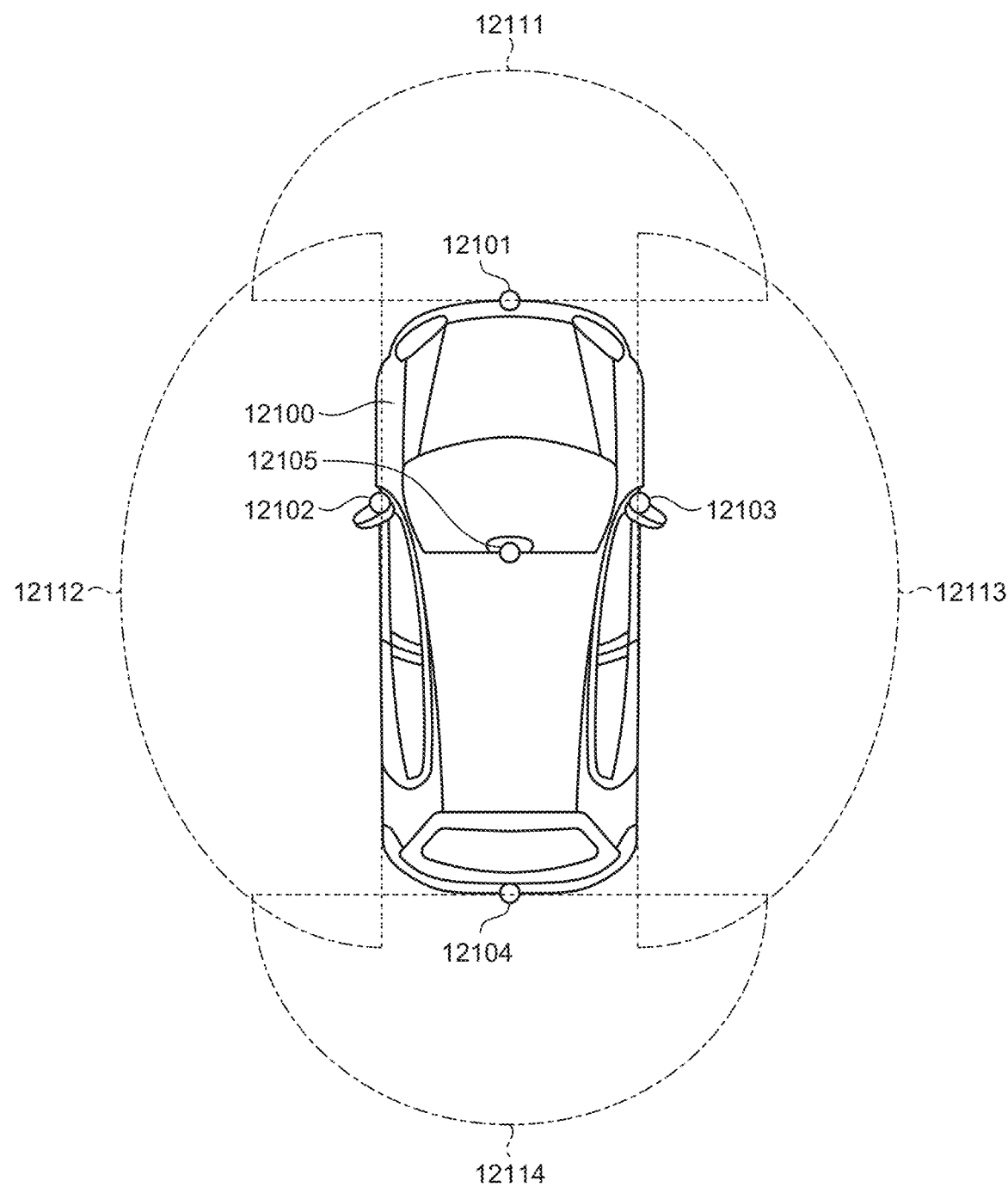
FIG. 35 is a view illustrating an example of a position where an imaging unit illustrated in FIG. 34 is placed.

FIG. 35 is a view illustrating an example of a position where the imaging unit 12031 is placed.

In FIG. 35, imaging units 12101, 12102, 12103, 12104, and 12105 are included as the imaging unit 12031.

The imaging units 12101, 12102, 12103, 12104, and 12105 are provided, for example, in positions of a front nose, side-view mirrors, a rear bumper, a back door, an upper portion of a windshield in a vehicle interior, and the like in a vehicle 12100. The imaging unit 12101 provided at the front nose and the imaging unit 12105 provided at the upper portion of the windshield in the vehicle interior mainly acquire an image in front of the vehicle 12100. The imaging units 12102 and 12103 provided at the side-view mirrors mainly acquire images on the sides of the vehicle 12100. The imaging unit 12104 provided at the rear bumper or the back door mainly acquires an image behind the vehicle 12100. The imaging unit 12105 provided at the upper portion of the windshield in the vehicle interior is mainly used to detect a preceding vehicle, a pedestrian, an obstacle, a traffic light, a traffic sign, a lane, or the like.

Meanwhile, FIG. 35 illustrates examples of imaging ranges of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 provided at the side-view mirrors, respectively, and an imaging range 12114 indicates an imaging range of the imaging unit 12104 provided at the rear bumper or the back door. For example, pieces of image data captured by the imaging units 12101 to 12104 are superimposed, to produce an overhead-view image of the vehicle 12100 viewed from above.

At least one of the imaging units 12101 to 12104 may have a function of acquiring distance information. For example, at least one of the imaging units 12101 to 12104 may be a stereoscopic camera including a plurality of imaging elements, or may be an imaging element having pixels for phase difference detection.

For example, the microcomputer 12051 obtains a distance to each solid object in the imaging ranges 12111 to 12114 and variation of the distance with time (relative speed with respect to the vehicle 12100) based on the distance information acquired from the imaging units 12101 to 12104. Then, the microcomputer 12051 extracts, as a preceding vehicle, a solid object that is travelling at a predetermined speed (0 km/h or higher, for example) in substantially the same direction as the vehicle 12100 and is closest to the vehicle 12100 on a path on which the vehicle 12100 is travelling, in particular. Further, the microcomputer 12051 can beforehand set an inter-vehicle distance that should be secured behind a preceding car, to perform automatic braking control (including follow-up stop control), automatic speed-up control (including follow-up start control), and the like. In this manner, it is possible to perform cooperative control for the purpose of automatic driving or the like in which the vehicle autonomously travels without depending on the operation of the driver.

For example, based on the distance information acquired from the imaging units 12101 to 12104, the microcomputer 12051 can classify pieces of solid-object data about solid objects into two-wheeled vehicles, ordinary vehicles, large vehicles, pedestrians, and other solid objects such as utility poles, and extract any piece of the solid-object data, to use it for automatic evasion of obstacles. For example, the microcomputer 12051 distinguishes obstacles that can be visually recognized by the driver of the vehicle 12100 and obstacles that are difficult to visually recognize, from each other, in all obstacles around the vehicle 12100. Then, the microcomputer 12051 determines a collision risk indicating a risk of collision with each obstacle. When the collision risk is equal to or higher than a predetermined value, indicating a possibility of collision, the microcomputer 12051 can output a warning to the driver via the audio speaker 12061 or the display unit 12062, or can perform forced slow-down or steering for evasion via the drive-system control unit 12010, thereby supporting driving for the purpose of avoiding collision.

At least one of the imaging units 12101 to 12104 may be an infrared camera that detects infrared radiation. For example, the microcomputer 12051 can recognize a pedestrian by determining whether or not a pedestrian is present in captured images of the imaging units 12101 to 12104. Such recognition of a pedestrian is achieved by, for example, a procedure of extracting feature points in the captured images of the imaging units 12101 to 12104 serving as infrared cameras, and a procedure of performing pattern matching on a sequence of feature points indicating a contour of an object to determine whether or not the object is a pedestrian. When the microcomputer 12051 determines that a pedestrian is present in the captured images of the imaging units 12101 to 12104 and recognizes the pedestrian, the audio/image output unit 12052 controls the display unit 12062 such that the display unit 12062 displays the recognized pedestrian while superimposing a rectangular contour line for emphasis on the recognized pedestrian. Further, the audio/image output unit 12052 may control the display unit 12062 such that the display unit 12062 displays an icon or the like indicating a pedestrian at a desired position.

One example of the vehicle control system to which the technique according to the present disclosure can be applied has been described above. The technique according to the present disclosure can be applied to the imaging unit 12031 or the like among the components described above. Specifically, the spectroscopic measurement apparatus 940A can be applied to the imaging unit 12031 or the like. Applying the technique according to the present disclosure to the imaging unit 12031 enables improvement in wavelength resolution, thereby improving the detection accuracy of information about the outside of a vehicle.

3.9 Example of Application to Endoscopic Surgery System

The technique according to the present disclosure (present technique) can be applied to various products. For example, the technique according to the present disclosure may be applied to an endoscopic surgery system.

Figure 36:
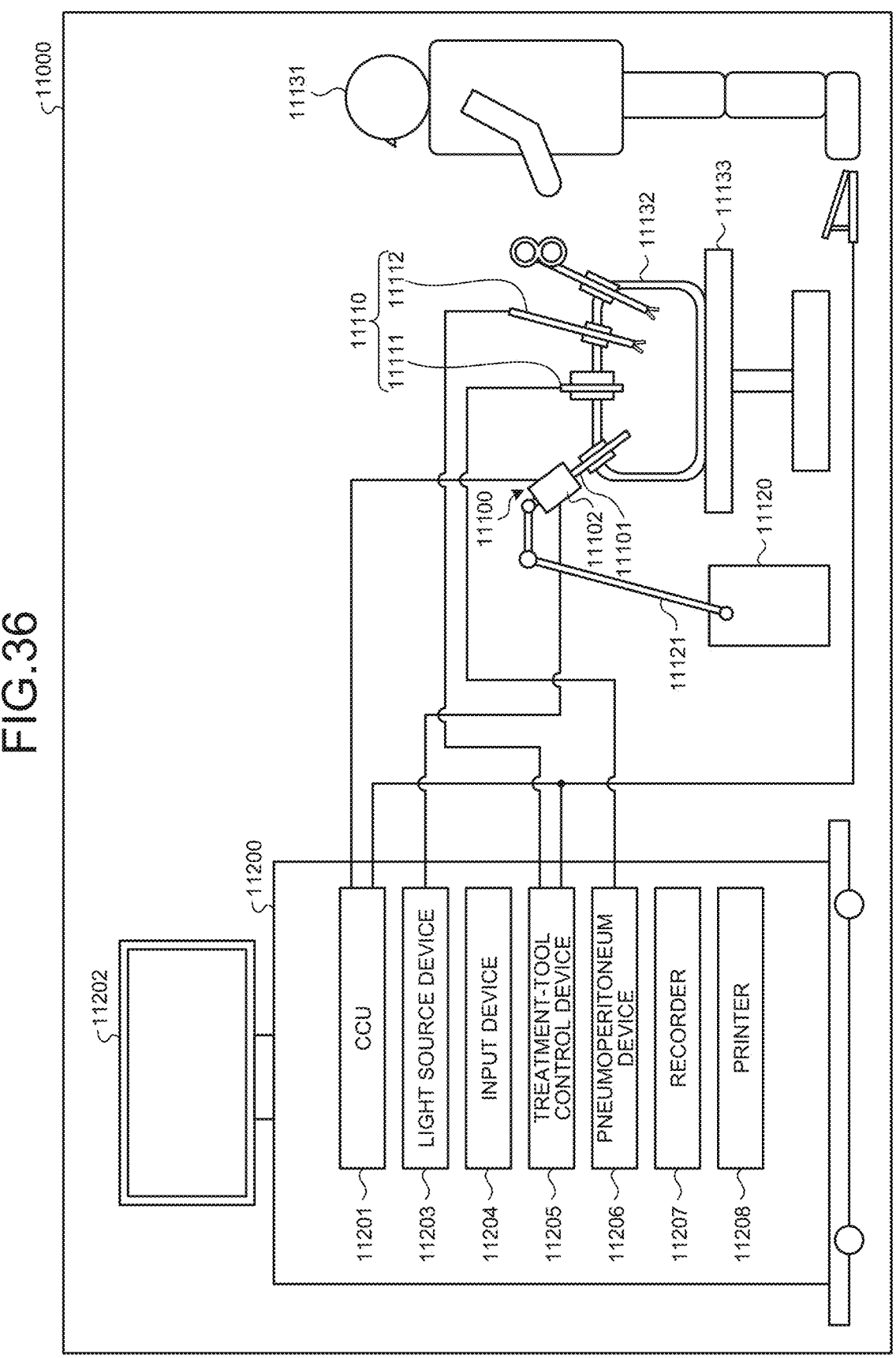
FIG. 36 is a view illustrating a schematic configuration example of an endoscopic surgery system to which the technique according to the present disclosure (the present technique) is applicable.

FIG. 36 is a view illustrating a schematic configuration example of an endoscopic surgery system to which the technique according to the present disclosure (the present technique) is applicable.

FIG. 36 illustrates a state in which an operator (surgeon) 11131 is performing surgery on a patient 11132 on a patient bed 11133 using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 whose part of a predetermined length from its tip end is inserted into a body cavity of the patient 11132, and a camera head 11102 connected to a base end of the lens barrel 11101. In the illustrated example, the endoscope 11100 configured as a so-called rigid scope having the rigid lens barrel 11101 is illustrated. However, the endoscope 11100 may be configured as a so-called flexible scope having a flexible lens barrel.

An opening into which an objective lens is fitted is provided at the tip end of the lens barrel 11101. A light source device 11203 is connected to the endoscope 11100, and light generated by the light source device 11203 is guided to the tip end of the lens barrel by a light guide extending inside the lens barrel 11101, and is emitted toward an observed object in the body cavity of the patient 11132 via the objective lens. Additionally, the endoscope 11100 may be a forward-viewing endoscope, an oblique-viewing endoscope, or a side-viewing endoscope.

An optical system and an imaging element are provided inside the camera head 11102, and reflected light (observation light) from the observed object is focused on the imaging element by the optical system. The observation light is photoelectrically converted by the imaging element, and an electric signal corresponding to the observation light, specifically, an image signal corresponding to the observation image, is generated. The image signal is transmitted to a camera control unit (CCU) 11201 as RAW data.

The CCU 11201 includes a central processing unit (CPU), a graphics processing unit (GPU), and the like, and controls the operations of the endoscope 11100 and a display device 11202 in a centralized manner. Further, the CCU 11201 receives an image signal from the camera head 11102, and performs various kinds of image processing for displaying an image based on the image signal, such as a development process (demosaicing), for example, on the image signal.

The display device 11202 displays an image based on the image signal having been subjected to the image processing by the CCU 11201, under the control of the CCU 11201.

The light source device 11203 includes a light source such as a light emitting diode (LED), for example, and supplies irradiation light for photographing a surgical site or the like to the endoscope 11100.

An input device 11204 is an input interface for the endoscopic surgery system 11000. A user can input various kinds of information and instructions to the endoscopic surgery system 11000 via the input device 11204. For example, a user inputs an instruction or the like for changing imaging conditions (kind of irradiation light, magnification, focal length, and the like) of the endoscope 11100.

A treatment-tool control device 11205 controls drive of the energy treatment tool 11112 for cauterization and incision of tissue, sealing of a blood vessel, or the like. A pneumoperitoneum device 11206 feeds gas into the body cavity of the patient 11132 via the pneumoperitoneum tube 11111 to inflate the body cavity for the purpose of securing a visual field for the endoscope 11100 and securing a working space of an operator. A recorder 11207 is a device capable of recording various kinds of information about surgery. A printer 11208 is a device capable of printing various kinds of information about surgery in various formats such as text, an image, or a graph.

Additionally, the light source device 11203 that supplies irradiation light used for photographing a surgical site to the endoscope 11100 can be formed of, for example, an LED, a laser light source, or a white light source formed of a combination of an LED and a laser light source. In a case where a white light source formed of a combination of RGB laser light sources is used, the output intensity and the output timing of each color (each wavelength) can be controlled with high accuracy, so that the white valance of a captured image can be adjusted in the light source device 11203. Further, in this case, by irradiating an observed object with laser light from laser light sources for R, G, and B in a time-division manner and controlling drive of the imaging element of the camera head 11102 in synchronization with the irradiation, it is also possible to capture images corresponding to R, G, and B, respectively, in a time-division manner. According to this method, a color image can be obtained without a color filter in the imaging element.

Further, drive of the light source device 11203 may be controlled such that the intensity of output light is changed at regular time intervals. In this case, drive of the imaging element of the camera head 11102 is controlled in synchronization with the change of the light intensity, whereby images are acquired in a time-division manner. Then, by combining the obtained images, it is possible to generate an image with a high dynamic range and without so-called blocked-up shadows and blown-out highlights.

Moreover, the light source device 11203 may be configured to be capable of supplying light in a predetermined wavelength band corresponding to special-light observation. In the special-light observation, for example, by taking advantage of wavelength dependence of light absorption in body tissue, so-called narrow-band imaging is performed in which predetermined tissue such as a blood vessel in the surface layer of a mucous membrane is irradiated with light in a narrower band than that of irradiation light for normal observation (that is, white light) to be photographed with high contrast. Alternatively, in the special-light observation, fluorescence observation may be performed in which an image is obtained by fluorescence generated by irradiation with excitation light. In the fluorescence observation, it is possible to irradiate body tissue with excitation light to observe fluorescence from the body tissue (autofluorescence observation), or to locally inject a reagent such as indocyanine green (ICG) into body tissue and irradiate the body tissue with excitation light corresponding to a fluorescence wavelength of the reagent to obtain a fluorescent image. The light source device 11203 can be configured to be capable of supplying narrow-band light and/or excitation light adaptable to the above-described special-light observation.

Figure 37:
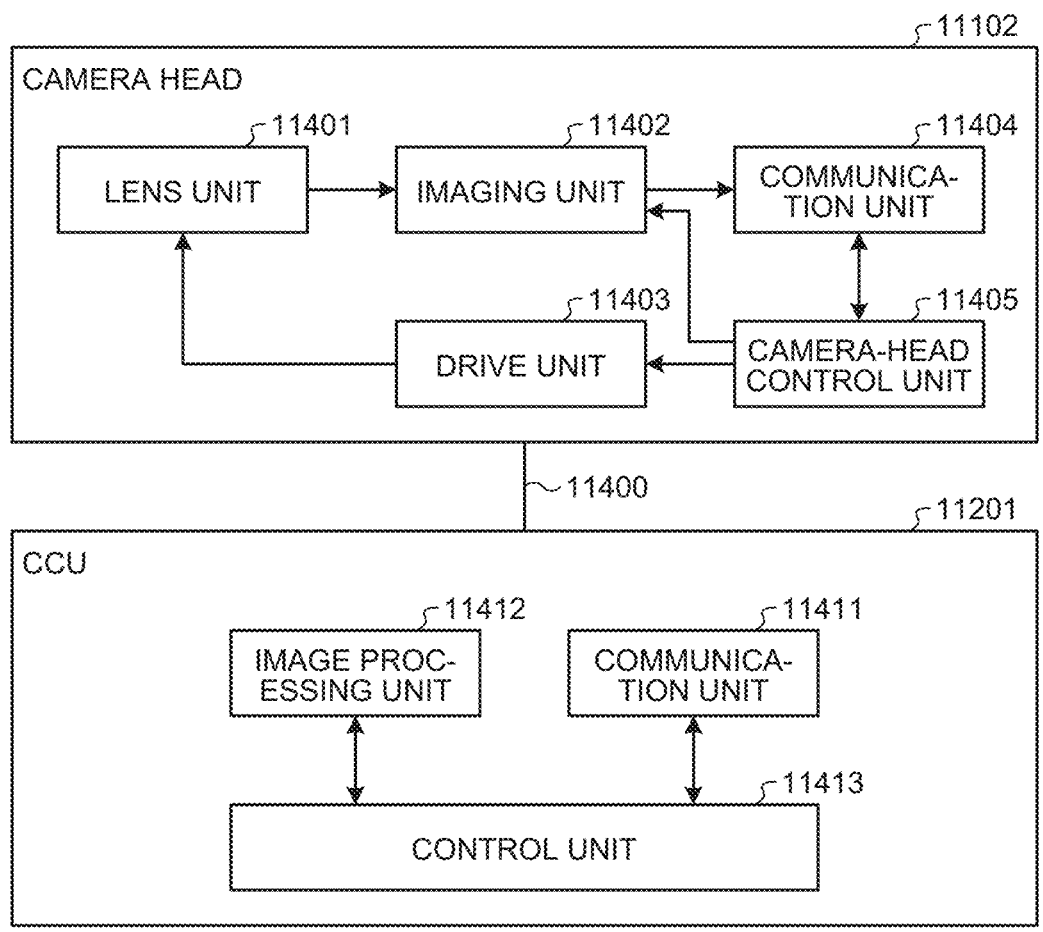
FIG. 37 is a block diagram illustrating examples of functional configurations of a camera head and a CCU illustrated in FIG. 36.

FIG. 37 is a block diagram illustrating examples of functional configurations of the camera head 11102 and the CCU 11201 illustrated in FIG. 36.

The camera head 11102 includes a lens unit 11401, an imaging unit 11402, a drive unit 11403, a communication unit 11404, and a camera-head control unit 11405. The CCU 11201 includes a communication unit 11411, an image processing unit 11412, and a control unit 11413. The camera head 11102 and the CCU 11201 are communicably connected to each other via a transmission cable 11400.

The lens unit 11401 is an optical system provided at a junction with the lens barrel 11101. Observation light having been taken in from the tip end of the lens barrel 11101 is guided to the camera head 11102 and is incident on the lens unit 11401. The lens unit 11401 is formed of a combination of a plurality of lenses including a zoom lens and a focus lens.

Either a single imaging element (so-called single-plate type) or plural imaging elements (so-called multi-plate type) may form the imaging unit 11402. In a case where the imaging unit 11402 is configured as a multi-plate imaging unit, a color image may be obtained by combination of image signals that are generated by respective imaging elements and correspond to R, G, and B, for example. Alternatively, the imaging unit 11402 may include a pair of imaging elements for acquiring an image signal for a right eye and an image signal for a left eye that are adaptable to three-dimensional (3D) display. With 3D display, the operator 11131 can more accurately grasp the depth of living tissue in a surgical site. Additionally, in a case where the imaging unit 11402 is configured as a multi-plate imaging unit, a plurality of lens units 11401 can be provided to correspond to respective imaging elements.

Meanwhile, the imaging unit 11402 is not necessarily required to be provided in the camera head 11102. For example, the imaging unit 11402 may be provided immediately behind the objective lens inside the lens barrel 11101.

The drive unit 11403 includes an actuator, and moves the zoom lens and the focus lens of the lens unit 11401 by a predetermined distance along the optical axis under the control of the camera-head control unit 11405. As a result, the magnification and the focal point of an image captured by the imaging unit 11402 can be appropriately adjusted.

The communication unit 11404 includes a communication device for transmitting and receiving various kinds of information to and from the CCU 11201. The communication unit 11404 transmits an image signal provided from the imaging unit 11402 as RAW data to the CCU 11201 via the transmission cable 11400.

Further, the communication unit 11404 receives a control signal for controlling drive of the camera head 11102 from the CCU 11201, and supplies the control signal to the camera-head control unit 11405. The control signal includes information about imaging conditions such as information for specifying a frame rate of a captured image, information for specifying an exposure value in imaging, and/or information for specifying the magnification and the focal point of a captured image, for example.

Additionally, the above-described imaging conditions such as a frame rate, an exposure value, a magnification, and a focal point may be appropriately specified by a user, or may be automatically set by the control unit 11413 of the CCU 11201 based on an image signal as provided. In the latter case, a so-called auto exposure (AE) function, a so-called auto focus (AF) function, and a so-called auto white balance (AWB) function are provided in the endoscope 11100.

The camera-head control unit 11405 controls drive of the camera head 11102 based on a control signal received from the CCU 11201 via the communication unit 11404.

The communication unit 11411 includes a communication device for transmitting and receiving various kinds of information to and from the camera head 11102. The communication unit 11411 receives an image signal transmitted from the camera head 11102 via the transmission cable 11400.

Further, the communication unit 11411 transmits a control signal for controlling drive of the camera head 11102, to the camera head 11102. The image signal and the control signal can be transmitted by electric communication, optical communication, or the like.

The image processing unit 11412 performs various kinds of image processing on an image signal that is RAW data transmitted from the camera head 11102.

The control unit 11413 performs various kinds of control regarding imaging of a surgical site or the like in the endoscope 11100 and display of a captured image obtained by imaging of a surgical site or the like. For example, the control unit 11413 generates a control signal for controlling drive of the camera head 11102.

Further, the control unit 11413 causes the display device 11202 to display a captured image showing a surgical site or the like, based on an image signal having been subjected to image processing by the image processing unit 11412. At that time, the control unit 11413 may recognize various objects in the captured image using various image recognition techniques. For example, the control unit 11413 can recognize a surgical tool such as forceps, a specific part in a body, bleeding, mist during usage of the energy treatment tool 11112, and the like by detecting the shape, color, and the like of the edge of an object included in the captured image. For display of the captured image on the display device 11202, the control unit 11413 may cause the display device 11202 to display various kinds of surgery supporting information while superimposing the information on the image of the corresponding surgical site by using the result of the above-described recognition. Because of display of such superimposed surgery support information that is presented to the operator 11131, the burden on the operator 11131 can be reduced, and the operator 11131 can reliably proceed with the surgery.

The transmission cable 11400 connecting the camera head 11102 and the CCU 11201 is an electric-signal cable adaptable to electric-signal communication, an optical fiber adaptable to optical communication, or a composite cable thereof.

In the illustrated example, communication is performed over wires using the transmission cable 11400. However, communication between the camera head 11102 and the CCU 11201 may be performed wirelessly.

Hereinabove, one example of the endoscopic surgery system to which the technique according to the present disclosure can be applied has been described. The technique according to the present disclosure can be applied to the imaging unit 11402 among the components described above. Applying the technique according to the present disclosure to the imaging unit 11402 enables acquirement of an image of a surgical site with greater clarity, thereby allowing an operator to reliably check the surgical site.

Additionally, though the endoscopic surgery system has been described above as one example, the technique according to the present disclosure may be applied to other systems such as a microscopic surgery system, for example.

Hereinabove, the embodiments of the present disclosure have been described. However, the technical scope of the present disclosure is not limited to the above-described embodiments, and various modifications are possible without departing from the gist of the present disclosure. Further, the components in different embodiments and modifications may be appropriately combined.

Moreover, the effects of each embodiment described in the present specification are mere examples and are not limiting, and other effects may be produced.

Furthermore, each of the above-described embodiments may be used singly, or may be used in combination with another embodiment.

In the above-described embodiments, the case where the modulator 300 bends the recording direction of a diffraction image in a curved shape has been described. However, the present disclosure is not limited thereto. For example, the modulator 300 can partially bend the recording direction of a diffraction image, bend the recording direction of a diffraction image in a different direction, or bend the recording direction of a diffraction image in a zigzag manner.

Moreover, the present technique can also have the following configurations.

(1)

A modulator provided between a diffraction grating and an image sensor, wherein
  the modulator receives a light ray directed to the image sensor from the diffraction grating and changes a travel direction of the light ray emitted toward the image sensor so as to bend a recording direction of a diffraction image for each of wavelengths of the light ray on a light receiving surface of the image sensor.

(2)

The modulator according to (1), wherein
  the modulator changes the travel direction of the light ray so as to curve the diffraction image having a wavelength at which the recording direction on the light receiving surface is linear among the wavelengths of the light ray received from the diffraction grating.

(3)

The modulator according to (1) or (2), wherein
  the modulator changes the travel direction of the light ray such that the bent diffraction image is fit in the light receiving surface.

(4)

The modulator according to any one of (1) to (3), wherein
  the modulator changes the travel direction of the light ray so as to suppress superimposition of the bent diffraction image and another diffraction image.

(5)

The modulator according to any one of (1) to (4), including
  a main body formed of a transmittable material, wherein
  the main body has an incidence plane formed in a shape of an incidence position based on a refractive index of the transmittable material and the light ray that is incident on a single point and has a single wavelength and a single incident angle.

(6)

An imaging apparatus including:
  a diffraction grating;
  an image sensor having a light receiving surface placed within a first distance of the diffraction grating; and
  a modulator provided between the diffraction grating and the image sensor, wherein
  the modulator
  receives a light ray directed to the image sensor from the diffraction grating and changes a travel direction of the light ray emitted toward the image sensor so as to bend a recording direction of a diffraction image for each of wavelengths of the light ray on a light receiving surface of the image sensor.

(7)
The imaging apparatus according to (6), further including a modulation lens placed between the diffraction grating and the modulator, wherein
the modulator is placed in a focal position of the modulation lens.

(8)
The imaging apparatus according to (6) or (7), further including
an imaging lens placed between the modulator and the image sensor, wherein
the imaging lens images the light ray emitted from the modulator on the light receiving surface.

(9)
The imaging apparatus according to (6), further including an imaging lens placed between the diffraction grating and the image sensor, wherein
the modulator is placed within a second distance of the light receiving surface of the image sensor so as to be placed in a focal plane of the imaging lens.

(10)
A method of designing a modulator that changes a travel direction of a light ray received from a diffraction grating and emits the light ray to an image sensor, the method including:
tracking behaviors of an incident light ray and an emitted light ray of the modulator in a space;
determining a surface normal of the modulator based on the incident light ray and the emitted light ray; and
integrating the surface normal to determine a shape of the modulator.

REFERENCE SIGNS LIST

300 Modulator
900 Measured object
901, 913 Prism
911 Light source
912, 932, 942 Slit
914 Linear sensor
921 Wavelength filter array
922, 947 Optical filter
923, 936, 946 Area sensor
931, 941 Objective lens
933, 943 Collimator lens
934 Spectroscopic element
940, 940A, 940B Spectroscopic measurement apparatus
944 Diffraction-grating spectroscopic element (diffraction grating)
935, 945 Imaging lens
948 Modulation lens

The invention claimed is:
1. A modulator, comprising:
a main body that includes a surface, wherein
the modulator is configured to:
receive a light ray directed to an image sensor from a diffraction grating, wherein the modulator is between the diffraction grating and the image sensor; and
change a travel direction of the light ray emitted toward the image sensor to bend a recording direction of a diffraction image for each of wavelengths of the light ray on a light receiving surface of the image sensor,
a surface shape of the surface of the main body is such that a part of the surface is convex, and
the part of the surface which is convex corresponds to the diffraction image for which the recording direction is bent on the light receiving surface of the image sensor.

2. The modulator according to claim 1, wherein
the modulator is further configured to change the travel direction of the light ray to curve the diffraction image that has a certain wavelength among the wavelengths of the light ray received from the diffraction grating, and
the certain wavelength is a wavelength at which the recording direction on the light receiving surface is linear.

3. The modulator according to claim 2, wherein
the modulator is further configured to change the travel direction of the light ray such that the diffraction image for which the recording direction is bent is fit in the light receiving surface.

4. The modulator according to claim 3, wherein
the modulator is further configured to change the travel direction of the light ray so as to suppress superimposition of the diffraction image for which the recording direction is bent and another diffraction image.

5. The modulator according to claim 4, wherein
the main body is of a transmittable material,
the main body has an incidence plane that has a shape of an incidence position based on a refractive index of the transmittable material and the light ray,
the light ray is incident on a single point, and
the light ray has a single wavelength and a single incident angle.

6. An imaging apparatus, including:
a diffraction grating;
an image sensor having a light receiving surface, wherein the image sensor is within a first distance of the diffraction grating;
a modulator between the diffraction grating and the image sensor, wherein the modulator is configured to:
receive a light ray directed to the image sensor from the diffraction grating; and
change a travel direction of the light ray emitted toward the image sensor to bend a recording direction of a diffraction image for each of wavelengths of the light ray on the light receiving surface of the image sensor; and
an imaging lens between the diffraction grating and the image sensor, wherein
the modulator is placed within a second distance of the light receiving surface of the image sensor and in a focal plane of the imaging lens.

7. The imaging apparatus according to claim 6, further including
a modulation lens between the diffraction grating and the modulator, wherein the modulator is in a focal position of the modulation lens.

8. The imaging apparatus according to claim 7, wherein
the imaging lens is between the modulator and the image sensor, and
the imaging lens is configured to image the light ray emitted from the modulator on the light receiving surface.

9. A method of designing a modulator, the method including:
tracking behaviors of an incident light ray and an emitted light ray of the modulator in a space, wherein the modulator is configured to:

change a travel direction of a light ray received from a diffraction grating; and emit the light ray to an image sensor;

determining a surface normal of the modulator based on the incident light ray and the emitted light ray; and integrating the surface normal to determine a surface shape of a surface of a main body of the modulator, wherein the surface shape of the surface of the main body is such that a part of the surface is convex, and the part of the surface which is convex corresponds to a diffraction image for which a recording direction of the diffraction image is bent on a light receiving surface of the image sensor.

* * * * *